United States Patent
Ding et al.

(10) Patent No.: US 11,086,450 B2
(45) Date of Patent: Aug. 10, 2021

(54) TOUCH CIRCUIT, TOUCH DEVICE AND TOUCH METHOD

(71) Applicant: BOE TECHNOLOGY GROUP CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Xueyou Cao, Beijing (CN); Wei Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/629,003

(22) PCT Filed: May 27, 2019

(86) PCT No.: PCT/CN2019/088532
§ 371 (c)(1),
(2) Date: Jan. 6, 2020

(87) PCT Pub. No.: WO2020/019855
PCT Pub. Date: Jan. 30, 2020

(65) Prior Publication Data
US 2021/0019016 A1    Jan. 21, 2021

(30) Foreign Application Priority Data
Jul. 25, 2018  (CN) .......................... 201810824705.3

(51) Int. Cl.
*G06F 3/042*   (2006.01)
*G06F 3/041*   (2006.01)
(Continued)

(52) U.S. Cl.
CPC .......... *G06F 3/0421* (2013.01); *G06F 3/0412* (2013.01); *G06F 3/0418* (2013.01);
(Continued)

(58) Field of Classification Search
CPC .. G06F 3/0421; G06F 3/04166; G06F 3/0412; G06F 3/0418; G06K 9/0004; G09G 3/3225; G09G 3/3266
(Continued)

(56) References Cited

U.S. PATENT DOCUMENTS

2008/0258044 A1* 10/2008 Schrey ................. H04N 5/3575
                                                250/208.1
2009/0073141 A1*  3/2009 Chino .................... G06F 3/042
                                                345/175
(Continued)

FOREIGN PATENT DOCUMENTS

CN    101726942 A    6/2010
CN    101739180 A    6/2010
(Continued)

*Primary Examiner* — Prabodh M Dharia
(74) *Attorney, Agent, or Firm* — The Webb Law Firm

(57) ABSTRACT

The present disclosure provides a touch circuit, a touch device, and a touch method. The touch circuit includes: at least one photodetection circuit, and a first capacitor electrically connected to the at least one photodetection circuit. Each photodetection circuit is configured to detect modulated light reflected by a touch object, generate a modulation signal according to the modulated light, and output the modulation signal through the first capacitor.

14 Claims, 12 Drawing Sheets

(51) Int. Cl.
*G06K 9/00* (2006.01)
*G09G 3/3225* (2016.01)
*G09G 3/3266* (2016.01)

(52) U.S. Cl.
CPC ....... *G06F 3/04166* (2019.05); *G06K 9/0004* (2013.01); *G09G 3/3225* (2013.01); *G09G 3/3266* (2013.01); *G09G 2360/145* (2013.01)

(58) Field of Classification Search
USPC .............................. 345/173, 175; 250/208.1
See application file for complete search history.

(56) References Cited

U.S. PATENT DOCUMENTS

| | | | |
|---|---|---|---|
| 2009/0207154 A1* | 8/2009 | Chino | G06F 3/0416 345/175 |
| 2011/0096009 A1 | 4/2011 | Kurokawa et al. | |
| 2011/0122096 A1* | 5/2011 | Kim | G06F 3/0412 345/175 |
| 2012/0092302 A1* | 4/2012 | Imai | G06F 3/0412 345/175 |
| 2014/0285448 A1* | 9/2014 | Kim | G06F 3/0412 345/173 |
| 2015/0035794 A1* | 2/2015 | Zhitomirskiy | G06F 3/0445 345/174 |
| 2019/0114020 A1 | 4/2019 | Ding et al. | |

FOREIGN PATENT DOCUMENTS

| | | | | |
|---|---|---|---|---|
| CN | 102612677 A | | 7/2012 | |
| CN | 104836537 A | | 8/2015 | |
| CN | 204537099 U | | 8/2015 | |
| CN | 106488154 A | | 3/2017 | |
| CN | 106488154 B | * | 3/2017 | ............. H04N 5/378 |
| CN | 107591127 A | | 1/2018 | |
| CN | 107591127 B | * | 1/2018 | ............. G06F 3/041 |
| CN | 107609518 A | | 1/2018 | |
| CN | 104836537 B | * | 3/2018 | ............... H03F 1/34 |

\* cited by examiner

TOUCH CIRCUIT, TOUCH DEVICE AND TOUCH METHOD

CROSS-REFERENCE TO RELATED APPLICATIONS

The present application is a U.S. National Stage Application under 35 U.S.C. § 371 of International Patent Application No. PCT/CN2019/088532, filed on May 27, 2019, which claims priority to Chinese patent application No. 201810824705.3 filed on Jul. 25, 2018, the disclosure of both of which are incorporated by reference herein in entirety.

TECHNICAL FIELD

The present disclosure relates to a touch circuit, a touch device, and a touch method.

BACKGROUND

With the development of science and technology, the application of a touch screen has become more and more popular. The touch screen (e.g., an OLED (Organic Light Emitting Diode) display touch screen) of the related art may have a function of touch or fingerprint detection. In the related art, for example, photodetection technology may be utilized to implement touch or fingerprint detection.

SUMMARY

According to one aspect of embodiments of the present disclosure, a touch circuit is provided. The touch circuit comprises: at least one photodetection circuit, and a first capacitor electrically connected to the at least one photodetection circuit, wherein each of the at least one photodetection circuit is configured to detect modulated light reflected by a touch object, generate a modulation signal according to the modulated light, and output the modulation signal through the first capacitor.

In some embodiments, each of the at least one photodetection circuit comprises a photosensitive detector and a first switching transistor, a first terminal of the photosensitive detector is electrically connected to a first voltage terminal, and a second terminal of the photosensitive detector is electrically connected to a first terminal of the first switching transistor; and a second terminal of the first switching transistor is electrically connected to a first terminal of the first capacitor, and a control terminal of the first switching transistor is configured to receive a control signal.

In some embodiments, each of the at least one photodetection circuit further comprises: a second switching transistor, wherein a first terminal of the second switching transistor is electrically connected to a second voltage terminal, a second terminal of the second switching transistor is electrically connected to the second terminal of the photosensitive detector, and a control terminal of the second switching transistor is configured to receive a reset signal.

In some embodiments, the touch circuit further comprises a modulated light generating circuit configured to generate the modulated light having a predetermined frequency.

In some embodiments, the modulated light generating circuit comprises: a third switching transistor configured to output an electrical signal having a predetermined frequency in response to a switching signal having the predetermined frequency; and a light emitting device configured to emit the modulated light according to the electrical signal having the predetermined frequency.

In some embodiments, an intensity of the modulated light is positively correlated with that of ambient light.

In some embodiments, the touch circuit further comprising: a sampling circuit configured to collect the modulation signal output through the first capacitor to obtain a signal to be processed; and a demodulation circuit configured to demodulate the signal to be processed.

In some embodiments, the sampling circuit comprises: an amplifier, wherein a first input terminal of the amplifier is electrically connected to a second terminal of the first capacitor, a second input terminal of the amplifier is configured to receive a reference level signal, an output terminal of the amplifier is electrically connected to the demodulation circuit; a second capacitor, wherein a first terminal of the second capacitor is electrically connected to the first input terminal of the amplifier, and a second terminal of the second capacitor is electrically connected to the output terminal of the amplifier; and a sampling switch, wherein a first terminal of the sampling switch is electrically connected to the first terminal of the second capacitor, a second terminal of the sampling switch is electrically connected to the second terminal of the second capacitor, and a control terminal of the sampling switch is configured to receive a sampling signal.

In some embodiments, the sampling circuit comprises: an amplifier, wherein a first input terminal of the amplifier is electrically connected to a second terminal of the first capacitor, a second input terminal of the amplifier is configured to receive a reference level signal, an output terminal of the amplifier is electrically connected to the demodulation circuit; and a resistor, wherein a first terminal of the resistor is electrically connected to the first input terminal of the amplifier, and a second terminal of the resistor is electrically connected to the output terminal of the amplifier.

According to another aspect of embodiments of the present disclosure, a touch device is provided. The touch device comprises: a plurality of gate driving circuit blocks, each of which comprises at least one gate driving unit; a plurality of photodetection circuits, multiple rows of photodetection circuits among the plurality of photodetection circuits are electrically connected to a plurality of gate driving units among the plurality of gate driving circuit blocks in one-to-one correspondence; and at least one first capacitor, each of which is electrically connected to one or more columns of photodetection circuits among the plurality of photodetection circuits; wherein each of the plurality of gate driving circuit blocks is configured to transmit a control signal to at least one row of photodetection circuits electrically connected to the each of the plurality of gate driving circuit blocks; and each of the plurality of photodetection circuits is configured to detect modulated light reflected by a touch object, generate a modulation signal according to the modulated light, and output the modulation signal through a corresponding first capacitor in response to the control signal.

In some embodiments, the at least one first capacitor comprises a plurality of first capacitors; wherein the plurality of first capacitors are electrically connected to multiple columns of photodetection circuits among the plurality of photodetection circuits in one-to-one correspondence.

In some embodiments, at least partial columns of photodetection circuits among the plurality of photodetection circuits are electrically connected to a same first capacitor through switching devices respectively.

In some embodiments, the touch device further comprises a plurality of pixel units for display, wherein each of at least part of pixel units among the plurality of pixel units is provided with one of the plurality of photodetection circuits.

In some embodiments, each of the plurality of pixel units comprises a pixel compensation circuit; each of the at least part of pixel units comprises a modulated light generating circuit configured to generate the modulated light having a predetermined frequency; wherein, in each of the at least part of pixel units, a light emitting device is multiplexed by the modulated light generating circuit and the pixel compensation circuit.

According to another aspect of embodiments of the present disclosure, a touch method based on a touch circuit is provided. The touch method comprises: generating and emitting modulated light having a predetermined frequency by a modulated light generating circuit; and detecting the modulated light reflected by a touch object, generating a modulation signal according to the modulated light, and outputting the modulation signal through a first capacitor, by a photodetection circuit.

In some embodiments, the photodetection circuit comprises: a photosensitive detector, a first switching transistor, and a second switching transistor; a first terminal of the photosensitive detector electrically connected to a first voltage terminal, and a second terminal of the photosensitive detector electrically connected to a first terminal of the first switching transistor; a second terminal of the first switching transistor electrically connected to a first terminal of the first capacitor, and a control terminal of the first switching transistor configured to receive a control signal; a first terminal of the second switching transistor electrically connected to a second voltage terminal, a second terminal of the second switching transistor electrically connected to the second terminal of the photosensitive detector, and a control terminal of the second switching transistor configured to receive a reset signal; and the touch circuit comprises a sampling circuit configured to collect the modulation signal through the first capacitor; the touch method further comprises: applying a sampling signal to the sampling circuit to cause the sampling circuit to collect the modulation signal output through the first capacitor to obtain a signal to be processed; and demodulating the signal to be processed by a demodulation circuit; wherein the step of detecting the modulated light reflected by the touch object and generating the modulation signal by the photodetection circuit comprises: applying the reset signal to the second switching transistor of the photodetection circuit during collection of the modulation signal, so that the second switching transistor is turned on to reset a potential at the second terminal of the photosensitive detector.

In some embodiments, the step of generating and emitting the modulated light having the predetermined frequency by the modulated light generating circuit comprises: applying a switching signal having the predetermined frequency to the modulated light generating circuit to cause the modulated light generating circuit to emit the modulated light; wherein when the switching signal is at a first level, a start time of the sampling signal is after a start time of the switching signal, and an end time of the sampling signal is before an end time of the switching signal; and when the switching signal is at a second level, the start time of the sampling signal is after the start time of the switching signal, and the end time of the sampling signal is before the end time of the switching signal; wherein the first level is higher than the second level.

In some embodiments, an intensity of the modulated light is positively correlated with that of ambient light.

In some embodiments, the step of detecting the modulated light reflected by the touch object, generating the modulation signal, and outputting the modulation signal through the first capacitor by the photodetection circuit comprises: transmitting a control signal to at least one row of photodetection circuits electrically connected to each of a plurality of gate driving circuit blocks by the each of the plurality of gate driving circuit blocks; and detecting the modulated light reflected by the touch object, generating the modulation signal according to the modulated light, and outputting the modulation signal through a corresponding first capacitor in response to the control signal, by each of the corresponding photodetection circuits.

In some embodiments, the touch method further comprises: in a touch phase, each of the plurality of gate driving circuit blocks transmits the control signal to all the photodetection circuits electrically connected to the each of the plurality of gate driving circuit blocks, such that all the photodetection circuits corresponding to the each of plurality of gate driving circuit blocks detect the modulated light reflected by the touch object and generate the modulation signal according to the modulated light; and in a fingerprint detection phase, after a touch position is determined, one or more gate driving units of a gate driving circuit block corresponding to the touch position transmit the control signal to corresponding photodetection circuits row by row, such that the corresponding photodetection circuits detect the modulated light reflected by the touch object and generate the modulation signal according to the modulated light.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
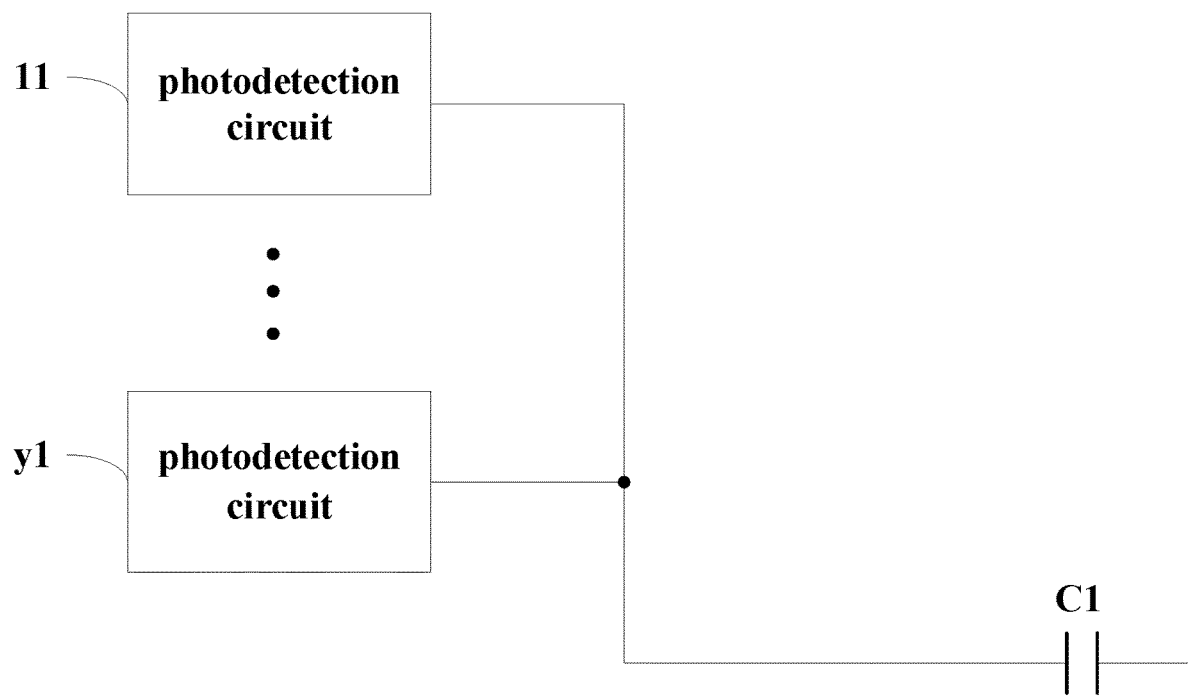
FIG. 1 is a connection diagram showing a touch circuit according to an embodiment of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include" or variants thereof means that the element before the word covers the element(s) listed after the word without excluding the possibility of covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It is also to be understood that the terms defined in for example general-purpose dictionaries should be construed as having meanings consistent with those in the context of the related art, rather than being construed in an idealized or extremely formalized sense unless explicitly thus defined here.

The techniques, methods, and devices known to a common technical person in the relevant art may not be discussed in detail, but where appropriate, the techniques, methods, and devices should be considered as part of the description.

The inventors of the present disclosure have found that, in the related art, when touch or fingerprint detection is performed, photodetection is often affected by ambient light (e.g. strong ambient light caused by outdoor sunlight at noon in summer), thereby causing the problem of inaccurate touch or fingerprint detection.

In view of this, embodiments of the present disclosure provide a touch circuit to eliminate the influence of ambient light on photodetection as much as possible. A touch circuit according to some embodiments of the present disclosure will be described in detail below in conjunction with the accompanying drawings.

FIG. 1 is a connection diagram showing a touch circuit according to an embodiment of the present disclosure. As shown in FIG. 1, the touch circuit comprises at least one photodetection circuit (e.g., photodetection circuits 11 to y1 and the like shown in FIG. 1) and a first capacitor C1. The first capacitor C1 is electrically connected to the at least one photodetection circuit. The first capacitor may be disposed on a display panel or an integrated circuit.

Each of the at least one photodetection circuit is configured to detect modulated light reflected by a touch object (e.g., a finger, a stylus and the like), generate a modulation signal according to the modulated light, and output the modulation signal through the first capacitor C1. For example, the modulation signal may be output to a sampling circuit, a demodulation circuit and the like, which will be described in detail later.

It should be noted that, the touch object according to embodiments of the present disclosure may be a contact type touch object or a non-contact type touch object. For example, the touch object may be implemented by using 3D suspension touch technology.

In the touch circuit according to the above-described embodiment, the modulated light is reflected by the touch object onto the photodetection circuit which detects the modulated light and generates a modulation signal according to the modulated light. The signal generated by ambient light irradiation on the photodetection circuit is a direct current signal. Since the first capacitor may produce the effect of blocking a direct current signal and passing an alternating current signal, the modulation signal may be output through the first capacitor, and the direct current signal is blocked by the first capacitor. Therefore, the touch circuit may eliminate the influence of ambient light on the photodetection as much as possible. For example, the touch circuit may eliminate the supersaturation effect on the photodetection caused by strong ambient light.

In some embodiments, the photodetection circuit generates the modulation signal after detecting the modulated light reflected by the touch object. The modulation signal generated by the photodetection circuit at a touch position may vary. After such modulation signal is collected and processed, the touch position may be determined to implement touch position detection.

In other embodiments, in the case where the modulated light detected by the photodetection circuit is the modulated light reflected by a fingerprint (here, the fingerprint is used as a touch object), the modulation signal contains fingerprint information. After such modulation signal is collected and processed, fingerprint information may be obtained to implement fingerprint detection.

It should be noted that, a column of photodetection circuits are shown in FIG. 1. Those skilled in the art will appreciate that, in some embodiments, there may be multiple columns of photodetection circuits as shown in FIG. 1 to implement the touch position detection or the fingerprint detection on the entire touch screen. For example, in multiple columns of photodetection circuits, each column of photodetection circuits are electrically connected to one first capacitor. That is, multiple columns of photodetection circuits are electrically connected to a plurality of first capacitors in one-to-one correspondence. In this way, the modulation signals of each column of photodetection circuits are respectively output through the corresponding first capacitors to implement the touch position detection or the fingerprint detection on the entire touch screen. For another example, the multiple columns of photodetection circuits are electrically connected to the same first capacitor, and a switching device is provided between each column of photodetection circuits and the first capacitor. By controlling the on or off of each of the switching devices, the modulation signals of each column of photodetection circuits are respectively controlled to be output through the first capacitor to implement the touch position detection or the fingerprint detection on the entire touch screen.

It should also be noted that, the scope according to embodiments of the present disclosure is not limited to the photodetection circuits being electrically connected to the first capacitor in a column direction, or may be electrically connected to the first capacitor in a row direction.

Figure 2:
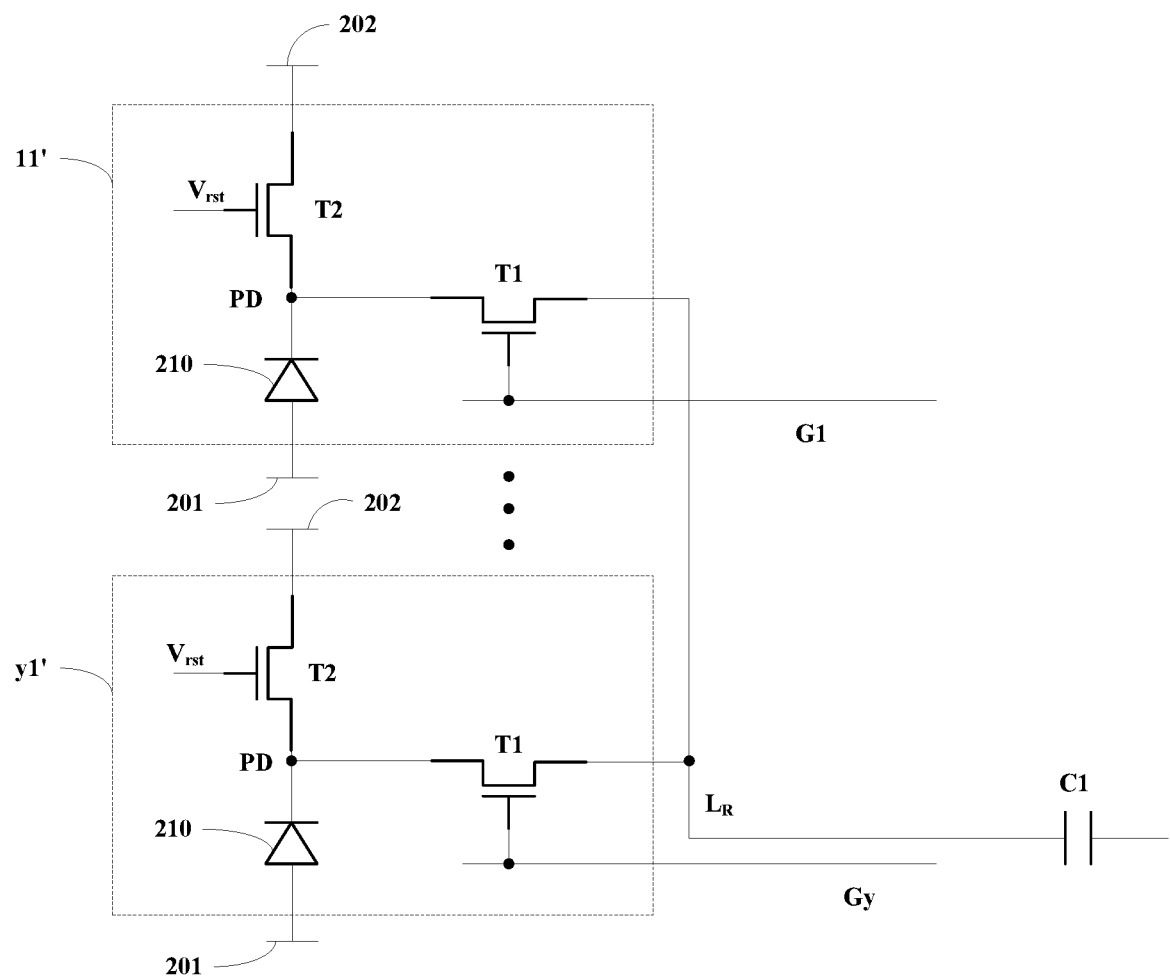
FIG. 2 is a connection diagram showing a touch circuit according to another embodiment of the present disclosure.

FIG. 2 is a connection diagram showing a touch circuit according to another embodiment of the present disclosure. The photodetection circuits 11' to y1' in FIG. 2 are a specific embodiment of the photodetection circuits 11 to y1 in FIG. 1. In some embodiments, as shown in FIG. 2, the photodetection circuit 11' (or y1' and the like) comprises a photosensitive detector 210 and a first switching transistor T1.

As shown in FIG. 2, a first terminal of the photosensitive detector 210 is electrically connected to a first voltage terminal 201. A second terminal of the photosensitive detector 210 is electrically connected to a first terminal (e.g., a first electrode) of the first switching transistor T1. For example, the second terminal of the photosensitive detector 210 and the first terminal of the first switching transistor T1 are both electrically connected to the node PD. The photosensitive detector is configured to generate the modulation signal after detecting the modulated light reflected by the touch object.

As shown in FIG. 2, a second terminal (e.g., a second electrode) of the first switching transistor T1 is electrically connected to a first terminal of the first capacitor C1. For example, the second terminal of the first switching transistor T1 is electrically connected to the first terminal of the first capacitor C1 through the read line $L_R$. A control terminal (e.g., a gate) of the first switching transistor T1 is configured to receive a control signal. For example, in the photodetection circuit 11', the control terminal of the first switching transistor T1 is configured to receive a control signal from a control line G1. For another example, in the photodetection circuit y1', the control terminal of the first switching transistor T1 is configured to receive a control signal from a control line Gy. The first switching transistor T1 is configured to be turned on in response to the control signal to output the modulation signal generated by the photosensitive detector to the first capacitor. Thus, the modulation signal may be output through the first capacitor. For example, the modulation signal is a current signal.

In some embodiments, as shown in FIG. 2, the photodetection circuit 11' (or y1' and the like) may further comprise a second switching transistor T2. As shown in FIG. 2, a first terminal (e.g., a first electrode) of the second switching transistor T2 is electrically connected to a second voltage terminal 202. A second terminal (e.g., a second electrode) of the second switching transistor T2 is electrically connected to a second terminal of the photosensitive detector 210. A control terminal (e.g., a gate) of the second switching transistor T2 is configured to receive a reset signal $V_{rst}$. The second switching transistor T2 is configured to be turned on in response to the reset signal $V_{rst}$ to reset a potential of the node PD between the first switching transistor T1 and the photosensitive detector (i.e., a potential at the second terminal of the photosensitive detector) to a potential at the second voltage terminal. In this way, it is possible to ensure that the PD node is at a static working point, thereby preventing the touch or fingerprint detection is affected by the photosensitive detector in a saturated state in the event of long-time exposure.

In some embodiments, as shown in FIG. 2, the photosensitive detector 210 may comprise a PIN (P-type semiconductor Intrinsic semiconductor N-type semiconductor) photodiode.

For example, as shown in FIG. 2, in a case where the first terminal of the photosensitive detector 210 is an anode terminal of the PIN photodiode, and the second terminal of the photosensitive detector 210 is a cathode terminal of the PIN photodiode, the level of the first voltage terminal 201 is lower than that of the second voltage terminal 202. For example, the level of the first voltage terminal 201 may be a negative level, and the level of the second voltage terminal 202 may be a positive level.

For another example, in a case where the first terminal of the photosensitive detector 210 is the cathode terminal of the PIN photodiode, and the second terminal of the photosensitive detector 210 is the anode terminal of the PIN photodiode, the level of the first voltage terminal is higher than that of the second voltage terminal. For example, the level of the first voltage terminal 201 may be a positive level, and the level of the second voltage terminal 202 may be a negative level.

In both cases, the level applied to the anode terminal of the PIN photodiode may be made lower than the level applied to the cathode terminal, thereby causing the PIN photodiode to be in a reversely biased state.

It should be noted that, a specific embodiment of the photodetection circuit is depicted in FIG. 2. Those skilled in the art will appreciate that, the photosensitive detector may be other embodiments. For example, the photosensitive detector may be another element (e.g., a photosensitive sensor, a photodetector, and the like). Accordingly, the scope of embodiments of the present disclosure is not limited to the embodiments of the photodetection circuit disclosed here.

In some embodiments of the present disclosure, the touch circuit may further comprise a modulated light generating circuit. The modulated light generating circuit is configured to generate the modulated light having a predetermined frequency.

Figure 3:
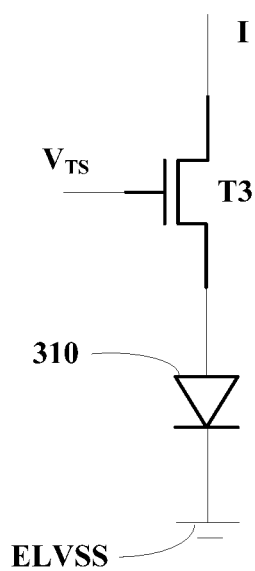
FIG. 3 is a connection diagram showing a modulated light generating circuit according to an embodiment of the present disclosure.

FIG. 3 is a connection diagram showing a modulated light generating circuit according to an embodiment of the present disclosure. As shown in FIG. 3, the modulated light generating circuit may comprise a third switching transistor T3 and a light emitting device (e.g., OLED) 310.

As shown in FIG. 3, a first terminal (e.g., a first electrode) of the third switching transistor T3 is configured to receive a current I. For example, the first terminal of the third switching transistor T3 is electrically connected to an integrated circuit or a constant current source (e.g., a constant current source made of a TFT (Thin Film Transistor) around), thereby receiving a constant current I from the integrated circuit or the constant current source. For example, the magnitude of the current I may depend on that of the ambient light. A photo sensor may be selected as an ambient light sensing unit. In a case of strong ambient light, the current I is made to be greater, so that it is impossible to visually discern abnormal light emission of the light emitting device caused by the touch due to strong ambient light. Moreover, a greater intensity of the modulated light is favorable for generating a stronger modulation signal, thereby eliminating the influence of ambient light on photodetection. Thus, in some embodiments, the intensity of the modulated light is positively correlated with that of the ambient light. For example, the intensity of the modulated light is substantially equal to that of the ambient light.

As shown in FIG. 3, a second terminal (e.g., a second electrode) of the third switching transistor T3 is electrically connected to an anode terminal of the light emitting device 310. A control terminal (e.g., a gate) of the third switching transistor T3 is configured to receive a switching signal $V_{TS}$ having a predetermined frequency. The third switching transistor T3 is configured to output an electrical signal (e.g., a current signal) having a predetermined frequency in response to the switching signal $V_{TS}$ having the predetermined frequency.

A cathode terminal of the light emitting device 310 is electrically connected to a ground terminal ELVSS. The light emitting device 310 is configured to emit the modulated light according to the electrical signal having the predetermined frequency.

In some embodiments, the light emitting device 310 may comprise: a light emitting device in a display panel or a light emitting device disposed outside the display panel. For example, each pixel of the display panel may comprise a pixel compensation circuit and the photodetection circuit described above. The light emitting device of the pixel compensation circuit may be multiplexed as the light emitting device for emitting modulated light. For example, in a case where the display panel is an OLED panel, the OLED device of the OLED panel may be used as the light emitting device that emits modulated light. This eliminates a need to add additional light emitting devices so that the cost is reduced. In addition, it should be understood by those skilled in the art that, the modulated light may be emitted by using the light emitting device disposed outside the display panel (e.g., an infrared light source provided externally), and it is also possible to enable the modulated light generating circuit to achieve the purpose of generating the modulated light.

Figure 4A:
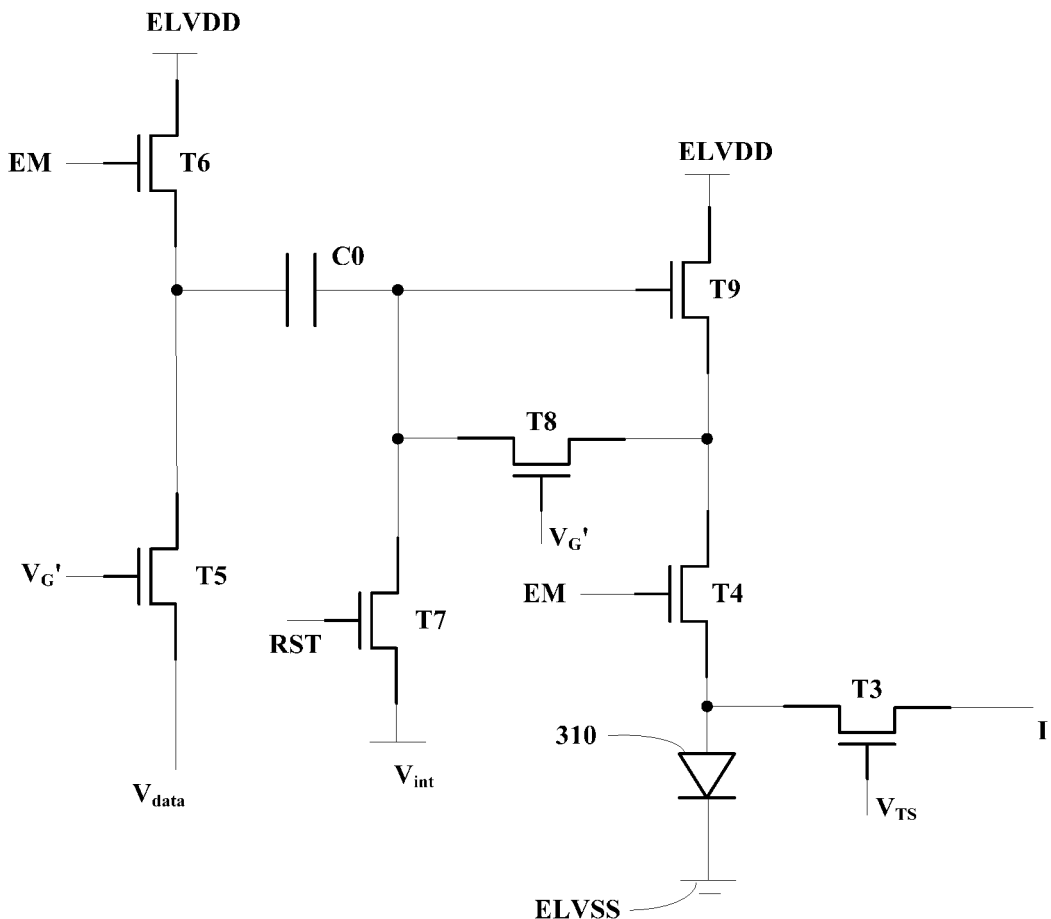
FIG. 4A is a connection diagram showing a pixel compensation circuit according to an embodiment of the present disclosure.

FIG. 4A is a connection diagram showing a pixel compensation circuit according to an embodiment of the present disclosure. As shown in FIG. 4A, the pixel compensation circuit may comprise the third switching transistor T3 and the light emitting device 310. In some embodiments, the pixel compensation circuit may further comprise a driving transistor T9, a fourth switching transistor T4, a fifth switching transistor T5, a sixth switching transistor T6, a seventh switching transistor T7, an eighth switching transistor T8, and a storage capacitor C0.

As shown in FIG. 4A, a first terminal (e.g., a first electrode) of the sixth switching transistor T6 is electrically connected to a power supply voltage terminal ELVDD. A second terminal (e.g., a second electrode) of the sixth switching transistor T6 is electrically connected to a first terminal (e.g., a first electrode) of the fifth switching transistor T5 and a first terminal of the storage capacitor C0. A control terminal (e.g., a gate) of the sixth switching transistor T6 is configured to receive a control signal EM. Here, the control signal EM is different from the control signal applied to the first switching transistor T1. For example, the control signal applied to the first switching transistor T1 as described above may be referred to as a first control signal, and the control signal EM applied to the sixth switching transistor T6 may be referred to as a second control signal. A second terminal (e.g., a second electrode) of the fifth switching transistor T5 is configured to receive a data level $V_{data}$. A control terminal (e.g., a gate) of the fifth switching transistor T5 is configured to receive a gate drive signal $V_G'$.

As shown in FIG. 4A, a first terminal (e.g., a first electrode) of the driving transistor T9 is electrically connected to the power supply voltage terminal ELVDD. A control terminal (e.g., a gate) of the driving transistor T9, a second terminal of the storage capacitor C0, a first terminal (e.g., a first electrode) of the seventh switching transistor T7, and the first terminal (e.g., a first electrode) of the eighth switching transistor T8 are electrically connected together. A second terminal (e.g., a second electrode) of the driving transistor T9, a second terminal (e.g., a second electrode) of the eighth switching transistor T8, and a first terminal (e.g., a first electrode) of the fourth switching transistor T4 are electrically connected together. A control terminal (e.g., a gate) of the eighth switching transistor T8 is configured to receive the gate drive signal $V_G'$. A second terminal (e.g., a second electrode) of the fourth switching transistor T4 is electrically connected to the anode terminal of the light emitting device 310. A control terminal (e.g., a gate) of the fourth switching transistor T4 is configured to receive the control signal EM. A second terminal (e.g., a second electrode) of the seventh switching transistor T7 is electrically connected to a third voltage terminal $V_{int}$. A control terminal (e.g., a gate) of the seventh switching transistor T7 is configured to receive a reset signal RST. For example, the reset signal RST is different from the reset signal $V_{rst}$ described above. For example, the reset signal $V_{rst}$ described above may be referred to as a first reset signal, and the reset signal RST here may be referred to as a second reset signal.

In some embodiments, a pixel circuit of the touch device comprises the pixel compensation circuit and the photodetection circuit. The pixel compensation circuit is used to control light emission of the OLED. The photodetection circuit is used to control detection of modulated light. As shown in FIG. 4A, the third switching transistor T3 is added to the pixel compensation circuit for controlling the light emitting device to emit modulated light having a certain gray scale during a touch phase, thereby performing touch or fingerprint detection. This embodiment eliminates a need to add additional light emitting devices, so that the cost is reduced.

It should be noted that, the pixel compensation circuit shown in FIG. 4A is a specific embodiment. Those skilled in the art should understand that, the pixel compensation circuit is not only limited to the embodiment shown in FIG. 4A, but may also be other embodiments. Therefore, the scope of the embodiments of the present disclosure is not only limited thereto.

It should also be noted that, the switching transistor or the driving transistor shown in the drawings according to embodiments of the present disclosure (e.g., FIG. 2, 3 or 4A and the like) may be an NMOS transistor. Those skilled in the art may understand that, the switching transistor or the driving transistor according to embodiments of the present disclosure may also be a PMOS transistor. Therefore, the scope according to embodiments of the present disclosure is not only limited thereto.

Figure 4B:
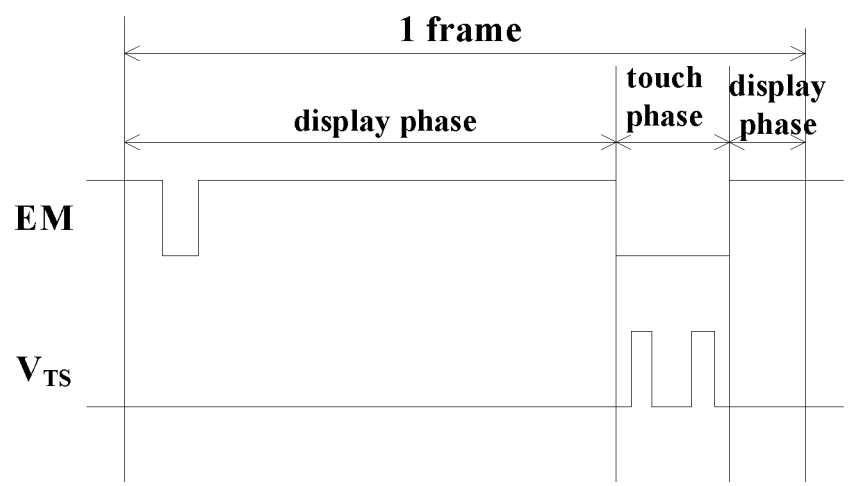
FIG. 4B is a timing control diagram showing a pixel compensation circuit during a display phase and a touch phase according to an embodiment of the present disclosure.

FIG. 4B is a timing control diagram showing a pixel compensation circuit during a display phase and a touch phase according to an embodiment of the present disclosure. The control signal EM and the switching signal $V_{TS}$ are shown in FIG. 4B. As shown in FIG. 4B, a 1 frame timing may comprise a display phase and a touch phase. In some embodiments, the display phase and the touch phase appear alternately. Of course, the touch phase may also be interspersed into the display phase to achieve a higher touch frame rate, which will not be described in detail here. At the touch phase, the fourth switching transistor T4 is turned off. The on or off of the third switching transistor T3 is controlled by the switching signal $V_{TS}$, such that the current I flows through the light emitting device 310 according to a predetermined frequency, to cause the light emitting device 310 to emit modulated light having the predetermined frequency.

It should be noted that, in the display phase shown in FIG. 4B, the control signal EM has a low level for a short time. At this time, the fourth switching transistor T4 is turned off. Since it is to turn off the fourth switching transistor T4 of a certain or a certain row of pixel compensation circuits in the entire display device (e.g., a display panel), that is, only one or one row of sub-pixels in the entire display device do not emit light, and the other or the other row of sub-pixels emit light, judged from the overall display, it may be considered that the pixel compensation circuit or the row of pixel compensation circuits are still in the display phase.

Figure 5:
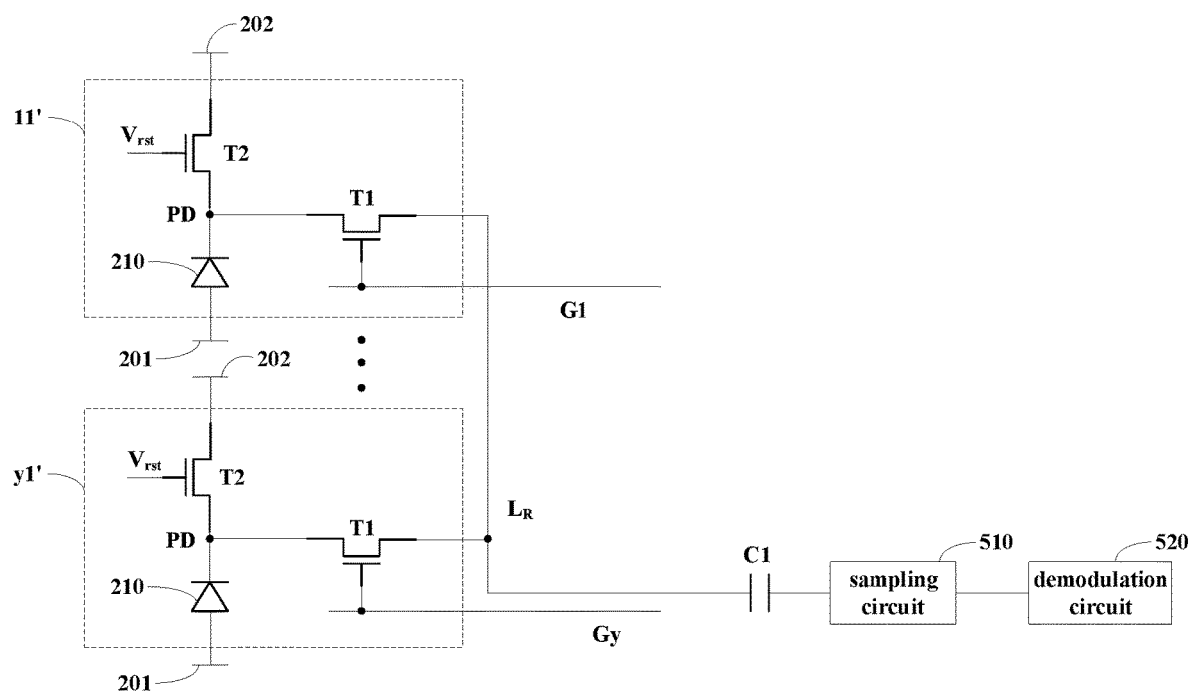
FIG. 5 is a connection diagram showing a touch circuit according to another embodiment of the present disclosure.

FIG. 5 is a connection diagram showing a touch circuit according to another embodiment of the present disclosure.

In some embodiments, as shown in FIG. 5, the touch circuit may further comprise a sampling circuit 510 and a demodulation circuit 520.

The sampling circuit 510 is configured to collect the modulation signal output through the first capacitor C1 to obtain a signal to be processed. The specific structure of the sampling circuit will be described later in detail in conjunction with the accompanying drawings.

The demodulation circuit 520 is configured to demodulate the signal to be processed. The demodulation circuit may take the form of a circuit in the related art known, which will not be described in detail here.

In this embodiment, the sampling circuit collects the modulation signal output through the first capacitor to obtain a signal to be processed, and transmits the signal to be processed to the demodulation circuit. The demodulation circuit demodulates the signal to be processed.

In a case of touch, the demodulation circuit may determine a touch position of the touch object according to variation of the modulation signal at the touch position to implement touch detection. In the case of fingerprint detection, the modulation signal may comprise fingerprint information. Therefore, the demodulation circuit may demodulate the fingerprint information from the modulation signal (i.e., the signal to be processed) collected by the sampling circuit to implement fingerprint detection.

Figure 6:
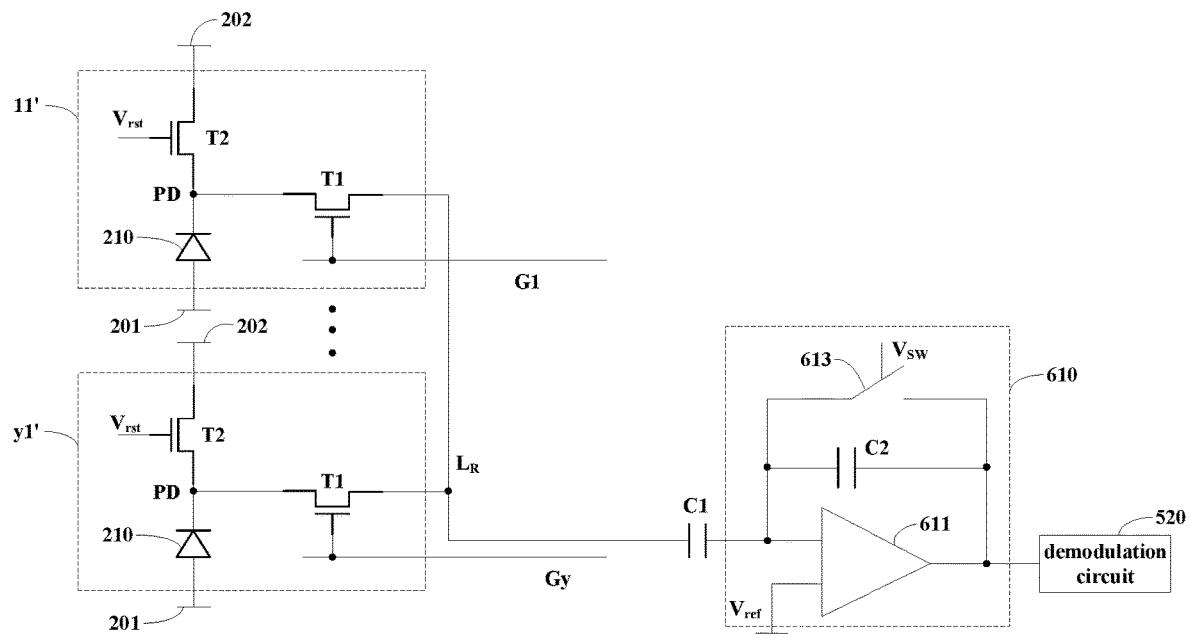
FIG. 6 is a connection diagram showing a touch circuit according to another embodiment of the present disclosure.

FIG. 6 is a connection diagram showing a touch circuit according to another embodiment of the present disclosure. A sampling circuit 610 shown in FIG. 6 is a specific embodiment of the sampling circuit 510 shown in FIG. 5.

In some embodiments, as shown in FIG. 6, the sampling circuit 610 may comprise an amplifier 611, a second capacitor C2, and a sampling switch 613.

As shown in FIG. 6, a first input terminal of the amplifier 611 is electrically connected to a second terminal of the first capacitor C1. A second input terminal of the amplifier 611 is configured to receive a reference level signal $V_{ref}$. For example, the second input terminal of the amplifier 611 may be electrically connected to a fixed level terminal to receive a fixed reference level signal $V_{ref}$. An output terminal of the amplifier 611 is electrically connected to the demodulation circuit 520.

As shown in FIG. 6, a first terminal of the second capacitor C2 is electrically connected to the first input terminal of the amplifier 611. A second terminal of the second capacitor C2 is electrically connected to the output terminal of the amplifier 611.

As shown in FIG. 6, a first terminal of the sampling switch 613 is electrically connected to the first terminal of the second capacitor C2. A second terminal of the sampling switch 613 is electrically connected to the second terminal of the second capacitor C2. A control terminal of the sampling switch 613 is configured to receive a sampling signal $V_{SW}$. For example, the sampling switch may comprise a switching transistor.

In this embodiment, the sampling circuit takes the form of an integral amplification circuit. The sampling switch 613 is turned off after receiving the sampling signal $V_{SW}$. Then, the sampling circuit performs sampling. In one sampling process, the second capacitor accumulates the collected modulation signal to obtain a signal to be processed, and transmits the signal to be processed to the demodulation circuit. The integral detection method may enhance the signal to noise ratio.

Figure 7:
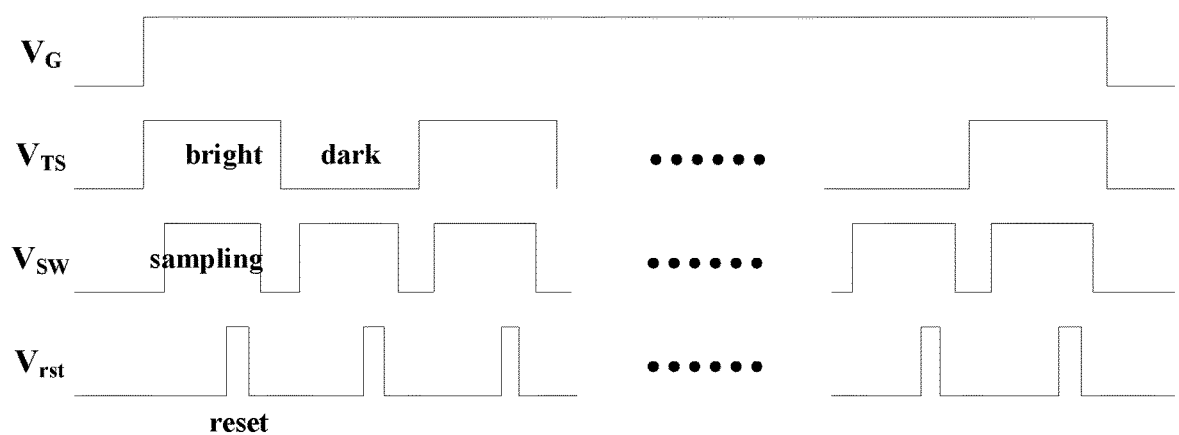
FIG. 7 is a timing control diagram showing a touch circuit according to an embodiment of the present disclosure.

FIG. 7 is a timing control diagram showing a touch circuit according to an embodiment of the present disclosure.

As shown in FIG. 7, a control signal $V_G$ may be applied to the control terminal of the first switching transistor T1. For example, the first switching transistor T1 is an NMOS transistor. In a case where the control signal $V_G$ is at a high level, the first switching transistor T1 is turned on.

As shown in FIG. 7, the switching signal $V_{TS}$ is applied to the control terminal of the third switching transistor T3. For example, the third switching transistor T3 is an NMOS transistor. In a case where the switching signal $V_{TS}$ is at a high level, the third switching transistor T3 is turned on, and the light emitting device 310 emits light (i.e., is bright). In a case where the switching signal $V_{TS}$ is at a low level, the third switching transistor T3 is turned off, and the light emitting device 310 does not emit light (i.e., is dark). This achieves the purpose of emitting modulated light by the light emitting device of the modulated light generating circuit.

As shown in FIG. 7, the sampling signal $V_{SW}$ is applied to the control terminal of the sampling switch 613. For example, the sampling switch may be a PMOS transistor. In a case where the sampling signal $V_{SW}$ is at a high level, the sampling switch is turned off. The second capacitor accumulates the collected modulation signal to implement sampling processing.

In some embodiments, as shown in FIG. 7, when the switching signal $V_{TS}$ is at a first level (e.g., a high level), a start time of the sampling signal $V_{SW}$ (e.g., a time corresponding to a rising edge of the sampling signal $V_{SW}$) is after a start time of the switching signal $V_{TS}$ (e.g., a time corresponding to a rising edge of the switching signal $V_{TS}$), and an end time of the sampling signal $V_{SW}$ (e.g., a time corresponding to a falling edge of the sampling signal $V_{SW}$) is before an end time of the switching signal $V_{TS}$ (e.g., a time corresponding to a falling edge of the switching signal $V_{TS}$). When the switching signal $V_{TS}$ is at a second level (e.g., a low level), the start time of the sampling signal $V_{SW}$ (e.g., the time corresponding to the rising edge of the sampling signal $V_{SW}$) is after the start time of the switching signal $V_{TS}$ (e.g., the time corresponding to the falling edge of the switching signal $V_{TS}$), and the end time of the sampling signal $V_{SW}$ (e.g., the time corresponding to the falling edge of the sampling signal $V_{SW}$) is before the end time of the switching signal $V_{TS}$ (e.g., the time corresponding to the rising edge of the switching signal $V_{TS}$). The first level is higher than the second level. For example, the sampling circuit collects the modulation signal in the case where the sampling signal $V_{SW}$ is a high level signal. For another example, when the switching signal $V_{TS}$ is at a high level, the third switching transistor is turned on, and when the switching signal $V_{TS}$ is at a low level, the third switching transistor is turned off.

Therefore, as shown in FIG. 7, the rising and falling edges of the sampling signal $V_{SW}$ avoid the rising and falling edges of the switching signal $V_{TS}$. That is, during the sampling, the time at which the modulation signal is integrated avoids the rising and falling edges of the switching signal $V_{TS}$. For example, the rising edge of the sampling signal $V_{SW}$ is later than the rising edge of the switching signal $V_{TS}$ at a high level, and the falling edge of the sampling signal $V_{SW}$ is earlier than the falling edge of the switching signal $V_{TS}$ at high level. The sampling signal causes the sampling circuit to sample in both a light-emitting and a non-light-emitting process of the light emitting device 310. Since the frequency of the switching signal $V_{TS}$ is the same as the light-emitting frequency, it is possible to avoid interference to the demodulation signal caused by the coupling of a signal line transmitting the switching signal $V_{TS}$ (i.e., a signal line electrically connected to the control terminal of the third switching transistor T3, not shown in the drawings) and the read line.

As shown in FIG. 7, the reset signal $V_{rst}$ is applied to the control terminal of the second switching transistor T2. For example, the second switching transistor T2 is an NMOS transistor. In a case where the reset signal $V_{rst}$ is at a high level, the second switching transistor T2 is turned on, so that the transitory static working point of the node PD is reset. In a case where the reset signal $V_{rst}$ is at a low level, the second switching transistor T2 is turned off. As shown in FIG. 7, the second switching transistor T2 may be turned on at the end of each sampling to reset the static working point of the node PD, and then the second switching transistor T2 is turned off to perform collection of the modulation signal within the next sampling period.

The control of the touch circuit is implemented by the above-described timing control signal as shown in FIG. 7. In this control process, the influence of ambient light on photodetection may be eliminated as much as possible.

Figure 8:
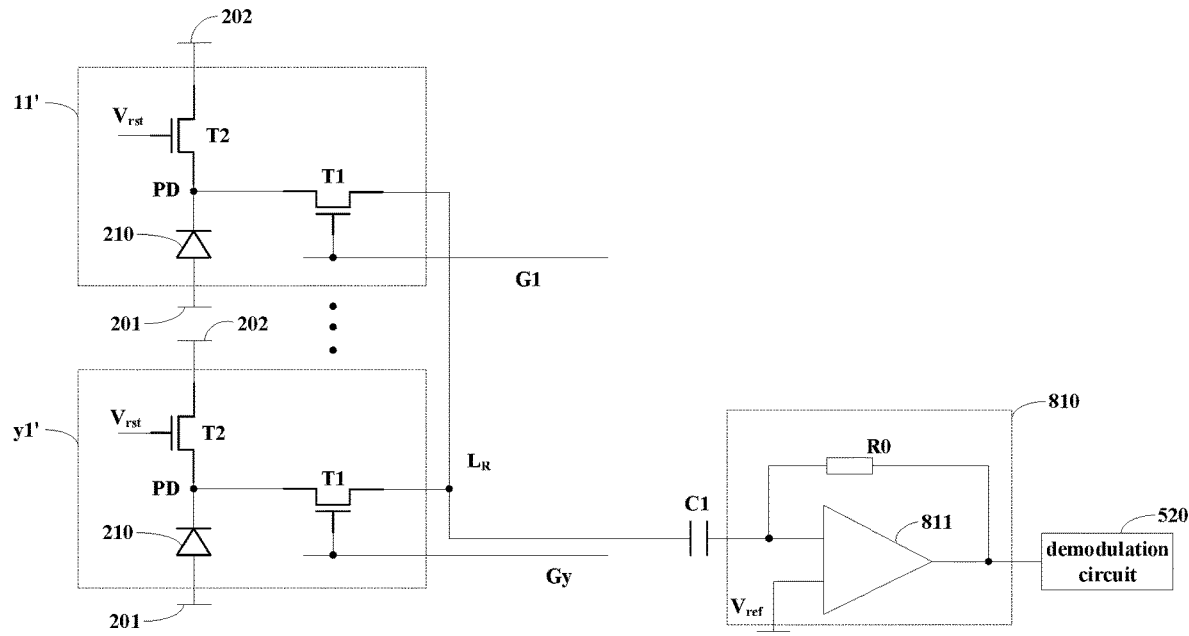
FIG. 8 is a connection diagram showing a touch circuit according to another embodiment of the present disclosure.

FIG. 8 is a connection diagram showing a touch circuit according to another embodiment of the present disclosure. The sampling circuit 810 shown in FIG. 8 is another specific embodiment of the sampling circuit 510 shown in FIG. 5.

In some embodiments, the sampling circuit 810 may comprise an amplifier 811 and a resistor R0. A first input terminal of the amplifier 811 is electrically connected to a second terminal of the first capacitor C1. A second input terminal of the amplifier 810 is configured to receive a reference level signal $V_{ref}$. For example, the second input terminal of the amplifier 811 may be electrically connected to a fixed level terminal to receive a fixed reference level signal $V_{ref}$. An output terminal of the amplifier 810 is electrically connected to the demodulation circuit 520. A first terminal of the resistor R0 is electrically connected to the first input terminal of the amplifier 811. A second terminal of the resistor R0 is electrically connected to the output terminal of the amplifier 811.

In this embodiment, the sampling circuit takes the form of a transconductance amplification circuit. During the sampling, the sampling circuit 810 does not need to accumulate the collected modulation signal as described in the sampling circuit 610, but obtains the signal to be processed by continuously collecting the modulation signal, and transmits the signal to be processed to the demodulation circuit. The transconductance manner which has the characteristic of transmitting the modulation signal in real time may reduce interference to the modulation signal caused by the signal line electrically connected to the control terminal of the third switching transistor T3.

Figure 9:
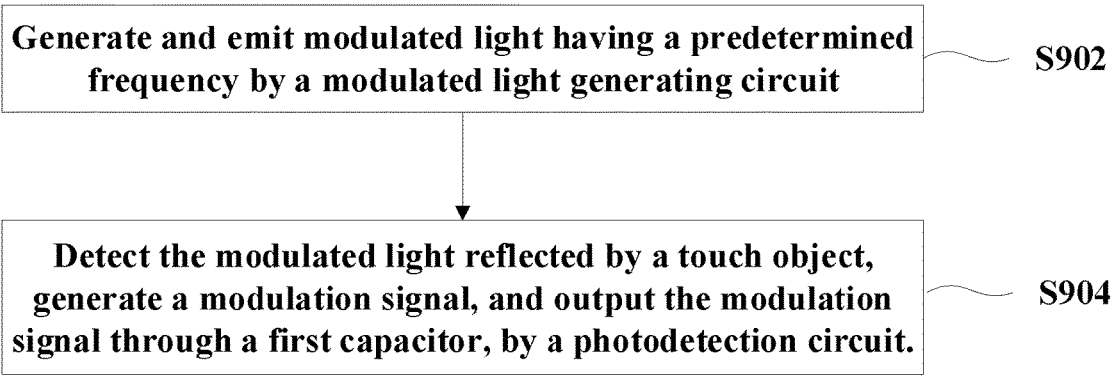
FIG. 9 is a flowchart showing a touch method for a touch circuit according to an embodiment of the present disclosure.

FIG. 9 is a flow chart showing a touch method for a touch circuit according to an embodiment of the present disclosure. The touch method may comprise steps S902 to S904.

In step S902, modulated light having a predetermined frequency is generated and emitted by a modulated light generating circuit.

In some embodiments, the step S902 may comprise: applying a switching signal having a predetermined frequency to the modulated light generating circuit to cause the modulated light generating circuit to emit the modulated light. For example, the switching signal having the predetermined frequency is applied to the third switching transistor of the modulated light generating circuit such that the light emitting device electrically connected to the third switching transistor emits the modulated light.

In step S904, the modulated light reflected by a touch object is detected, a modulation signal is generated according to the modulated light, and the modulation signal is output through the first capacitor, by the photodetection circuit.

In some embodiments, the photodetection circuit may comprise a photosensitive detector, a first switching transistor, and a second switching transistor. A first terminal of the photosensitive detector is electrically connected to a first voltage terminal, and a second terminal of the photosensitive detector is electrically connected to a first terminal of the first switching transistor. A second terminal of the first switching transistor is electrically connected to a first terminal of the first capacitor, and a control terminal of the first switching transistor is configured to receive a control signal. A first terminal of the second switching transistor is electrically connected to a second voltage terminal, a second terminal of the second switching transistor is electrically connected to the second terminal of the photosensitive detector, and a control terminal of the second switching transistor is configured to receive a reset signal.

In some embodiments, the step S904 may comprise: applying the control signal to the first switching transistor of the photodetection circuit such that the first switching transistor is turned on to output the modulation signal generated by the photosensitive detector of the photodetection circuit.

In some embodiments, the touch method may further comprise: applying a sampling signal to the sampling circuit to cause the sampling circuit to collect the modulation signal output through the first capacitor to obtain a signal to be processed; and demodulating the signal to be processed by a demodulation circuit. The signal to be processed is obtained by collecting the modulation signal, and the signal to be processed is demodulated, so that touch position detection or fingerprint detection may be implemented.

In some embodiments, when the switching signal is at a first level, a start time of the sampling signal is after a start time of the switching signal, and an end time of the sampling signal is before an end time of the switching signal. When the switching signal is at a second level, the start time of the sampling signal is after the start time of the switching signal, and the end time of the sampling signal is before the end time of the switching signal. The first level is higher than the second level.

In some embodiments, the step S904 may comprise: applying the reset signal to the second switching transistor of the photodetection circuit during collection of the modulation signal, so that the second switching transistor is turned on to reset a potential at the second terminal of the photosensitive detector (i.e., a potential at the node PD).

In the touch method according to the embodiment, modulated light having a predetermined frequency is generated and emitted by the modulated light generating circuit. After the modulated light is reflected by the touch object, the modulated light is received by the photodetection circuit. The modulated light reflected by the touch object is detected, a modulation signal is generated according to the modulated light, and the modulation signal is output through the first capacitor, by the photodetection circuit. Since the first capacitor may produce the effect of blocking a direct current and passing an alternating current, and the signal generated by irradiation of ambient light on the photodetection circuit is a direct current signal, the direct current signal is blocked by the first capacitor, while the modulation signal may be output through the first capacitor. Therefore, the touch method may eliminate the influence of ambient light on photodetection as much as possible. With the touch method, touch position detection or fingerprint detection may be implemented.

For example, the photodetection circuit generates the modulation signal after detecting the modulated light reflected by the touch object (e.g., a finger, a stylus and the like). The modulation signal generated by the photodetection circuit at a touch position may vary. After such modulation signal is collected and the collected modulation signal is demodulated, the touch position may be determined, so that the touch position detection is implemented.

For another example, in a case where the modulated light detected by the photodetection circuit is the modulated light reflected by a fingerprint (here, the fingerprint is used as a touch object), the modulation signal contains fingerprint information. After the modulation signal is collected and the collected modulation signal is demodulated, the fingerprint information may be obtained, so that the fingerprint detection is implemented.

Figure 10A:
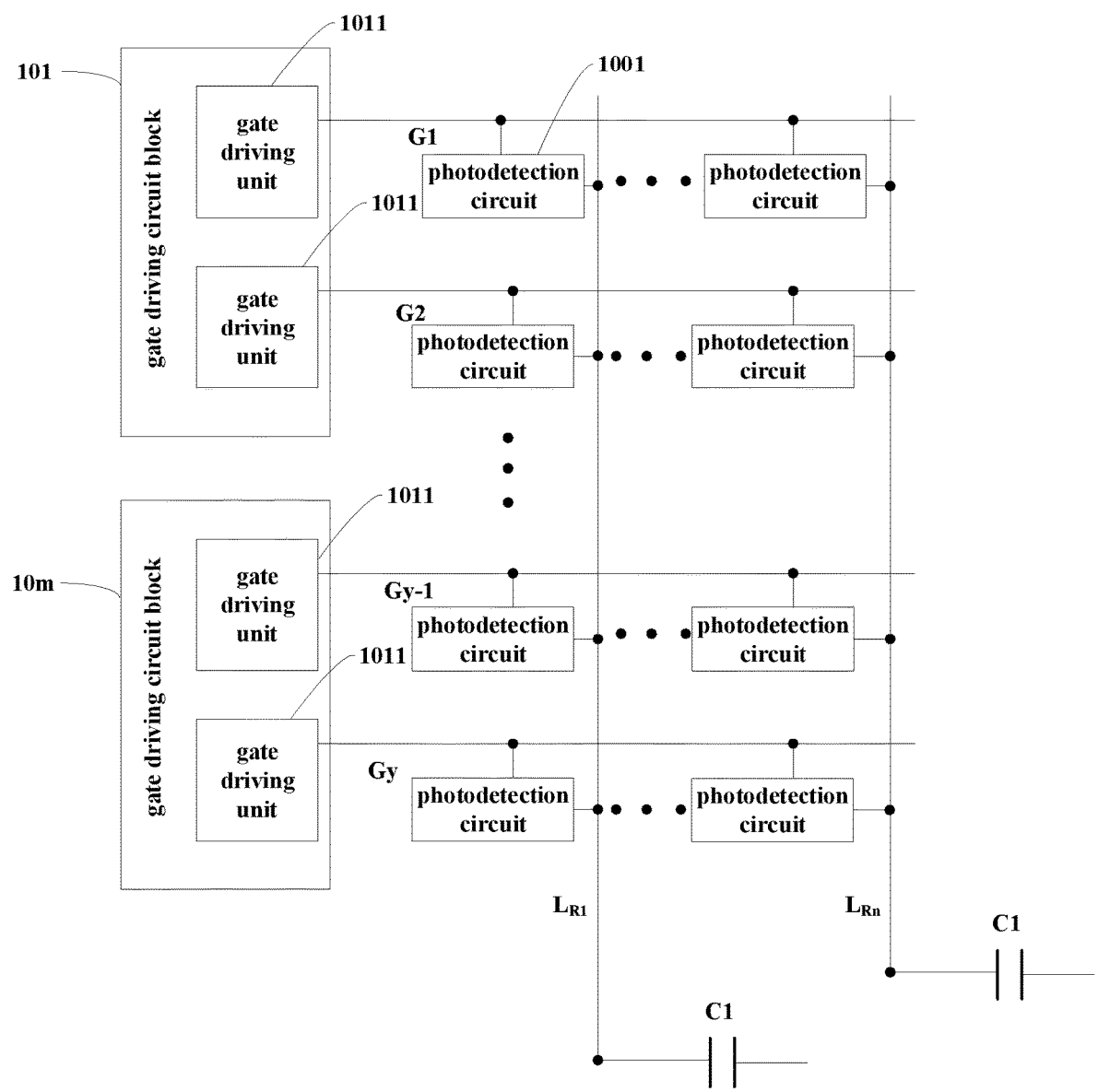
FIG. 10A is a connection diagram showing a touch device according to an embodiment of the present disclosure.

FIG. 10A is a connection diagram showing a touch device according to an embodiment of the present disclosure.

As shown in FIG. 10A, the touch device may comprise a plurality of gate driving circuit blocks (e.g., gate driving circuit blocks 101 to 10m, where m is a positive integer), a plurality of photodetection circuits (e.g., the photodetection circuit shown in FIG. 1 or FIG. 2) 1001, and at least one first capacitor C1.

In some embodiments, each gate driving circuit block may comprise at least one gate driving unit. For example, as shown in FIG. 10A, each gate driving circuit block may comprise two gate driving units 1011.

In some embodiments, as shown in FIG. 10A, the plurality of photodetection circuits 1001 form a photodetection circuit array. Multiple rows of photodetection circuits among the plurality of photodetection circuits 1001 are electrically connected to a plurality of gate driving units 1011 among the plurality of gate driving circuit blocks in one-to-one correspondence.

In some embodiments, each of the at least one first capacitor C1 is electrically connected to one or more columns of photodetection circuits among the plurality of photodetection circuits 1001. For example, as shown in FIG. 10A, the at least one first capacitor C1 comprises a plurality of first capacitors C1. Each of the plurality of first capacitors C1 is electrically connected to one column of photodetection circuits among the plurality of photodetection circuits. That is, the plurality of first capacitors C1 are electrically connected to multiple columns of photodetection circuits among the plurality of photodetection circuits in one-to-one correspondence.

FIG. 10A shows n columns of photodetection circuits, where n is a positive integer. Each column of photodetection circuits are electrically connected to one read line. For example, a first column of photodetection circuits are electrically connected to a first read line $L_{R1}$, and a nth column of photodetection circuits are electrically connected to a nth read line $L_{Rn}$. Each of the read lines is electrically connected to a first terminal of a corresponding first capacitor C1.

Each of the plurality of gate driving circuit blocks is configured to transmit a control signal to at least one row (e.g., two rows) of photodetection circuits 1001 electrically connected to the each of the plurality of gate driving circuit blocks. For example, the at least one gate driving unit 1011 of each gate driving circuit block transmits a control signal to a corresponding row of photodetection circuits 1001.

each of the plurality of photodetection circuits is configured to detect the modulated light reflected by a touch object, generate a modulation signal according to the modulated light, and output the modulation signal through a corresponding first capacitor in response to the control signal.

In the touch device according to the embodiment, the modulated light is reflected by the touch object onto the photodetection circuit which detects the modulated light and generates a modulation signal. The signal generated by ambient light irradiation on the photodetection circuit is a direct current signal. Since the first capacitor may produce the effect of blocking a direct current and passing an alternating current, the modulation signal may be output through the first capacitor, and the direct current signal is blocked by the first capacitor. Therefore, the touch device may eliminate the influence of ambient light on photodetection as much as possible.

In some embodiments, the touch device may further comprise a modulated light generating circuit (for example shown in FIG. 3). The modulated light generating circuit is configured to generate the modulated light having a predetermined frequency.

In some embodiments, the touch device may further comprise a sampling circuit and a demodulation circuit. The sampling circuit is configured to collect the modulation signal output through the first capacitor to obtain a signal to be processed. The demodulation circuit is configured to demodulate the signal to be processed. For example, in a case where the touch device comprises a plurality of first capacitors, the touch device may further comprise a plurality of sampling circuits, each of which is electrically connected to one first capacitor. Each sampling circuit may be electrically connected to one demodulation circuit, or a plurality of sampling circuits may be electrically connected to one demodulation circuit.

The processes of touch position detection and fingerprint detection will be respectively described below.

For example, during the touch position detection, each gate driving circuit block causes at least one row of corresponding photodetection circuits to detect the modulated light. The at least one row of corresponding photodetection circuits output a modulation signal to the sampling circuit through a corresponding first capacitor after detecting the modulated light reflected by the touch object and generating the modulation signal according to the modulated light. The sampling circuit collects the modulation signal to obtain a signal to be processed, and transmits the signal to be processed to a demodulation circuit. Since the modulation signal generated by the photodetection circuit at the touch position varies, the touch position may be determined by sampling and demodulation.

For another example, the fingerprint detection is performed after the touch position is determined. During the fingerprint detection, the gate driving units corresponding to the touch position are made to transmit a control signal row by row, so that the fingerprint detection is performed. The control signal transmitted row by row causes each row of photodetection circuits to sequentially perform detection of modulated light. The modulated light is modulated light reflected by the fingerprint, and therefore, the modulation signal generated by the photodetection circuit contains fingerprint information. The photodetection circuit outputs the modulation signal to the sampling circuit through a corresponding first capacitor. The sampling circuit collects the modulation signal to obtain a signal to be processed, and transmits the signal to be processed to the demodulation circuit. Thus, the fingerprint information is obtained by sampling and demodulation.

In the touch device shown in FIG. 10A, the plurality of gate driving circuits are divided into several blocks (or segments). For example, each gate driving circuit block has a width of less than 4 mm. These blocks share a clock CLK signal. However, an STV (Start Pulse to Gate Driver) is used for each gate driving circuit block, so that the turn-on of different gate driving circuit blocks is freely controlled. Each of the gate driving circuit blocks may scan row by row in a shift register manner, or the potentials of the gates of the first switching transistors of the photodetection circuits may all be pulled up or pulled down. In the touch phase, the plurality of gate driving circuit blocks sequentially outputs control signals, wherein all the gate driving units within each gate driving circuit block output a control signal to all the corresponding control lines (e.g., control lines G1 and G2, or Gy−1 and Gy and the like). After the touch position is determined, if there is a need for fingerprint detection, the gate driving circuit block in a corresponding area is turned on again. The gate driving circuit block in the corresponding area causes a corresponding row of photodetection circuits to scan row by row, so that the fingerprint detection is performed.

Figure 10B:
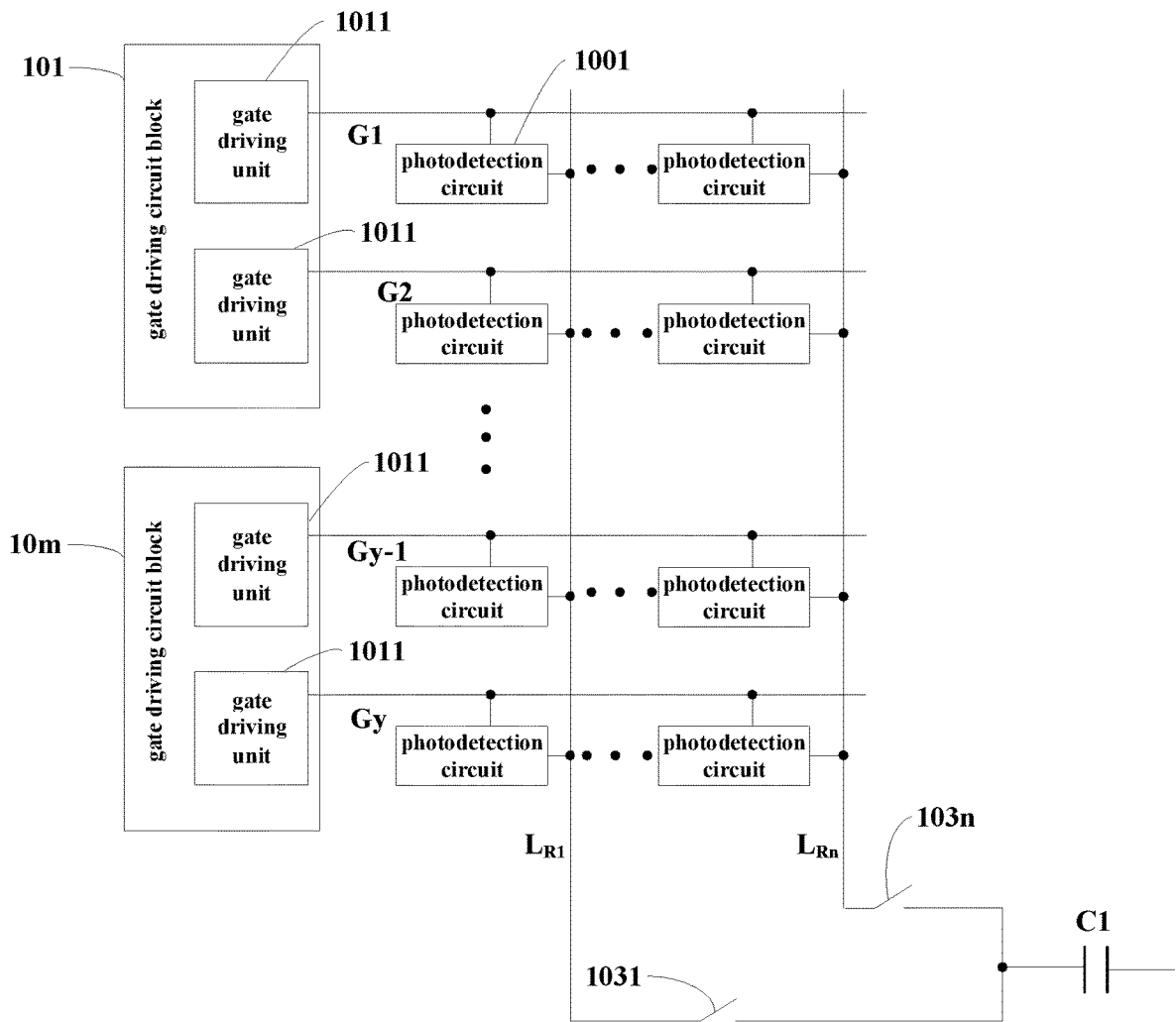
FIG. 10B is a connection diagram showing a touch device according to another embodiment of the present disclosure.

FIG. 10B is a connection diagram showing a touch device according to another embodiment of the present disclosure. Here, the units or devices shown in FIG. 10B that are the same as or similar to those in FIG. 10A will not be described in detail again.

In some embodiments, at least partial columns of photodetection circuits among the plurality of photodetection circuits 1001 are electrically connected to a same first capacitor C1 through switching devices (e.g., switching devices 1031 to 103n, where n is a positive integer) respectively.

For example, as shown in FIG. 10B, the at least one first capacitor comprises one first capacitor C1. The first capacitor C1 is electrically connected to all the photodetection circuits.

In some embodiments, as shown in FIG. 10B, the touch device further comprises a plurality of switching devices 1031 to 103n (n is a positive integer). Each switching device is disposed between each column of photodetection circuits and the first capacitor C1. For example, the switching device 1031 is disposed between a first column of photodetection circuits and the first capacitor C1, and the switching device 103n is disposed between a nth column of photodetection circuits and the first capacitor C1.

When the touch detection or the fingerprint detection is performed, the plurality of switching device are sequentially controlled to be turned on (wherein only one switching device is turned on during each control), so that a certain photodetection circuit among each column of photodetection circuits outputs the modulation signal through the first capacitor C1.

Compared to the circuit structure in FIG. 10A, the above-described embodiment may reduce the number of the first capacitors, so that the size of the circuit and the cost may be reduced.

In other embodiments, the at least one first capacitor comprises a plurality of first capacitors. A part of multiple columns of photodetection circuits among the plurality of photodetection circuits are electrically connected to apart of the first capacitors in the plurality of first capacitors in one-to-one correspondence; and another part of multiple columns of photodetection circuits among the plurality of photodetection circuits are electrically connected to a same first capacitor in the plurality of first capacitors.

In the case where the multiple columns of photodetection circuits are electrically connected to the same first capacitor, a switching device is disposed between each of the multiple columns of photodetection circuits and a corresponding first capacitor. The switching device may function similarly to the switching device in FIG. 10B.

In some embodiments, the touch device may further comprise a plurality of pixel units for display. At least part of pixel units among the plurality of pixel units are provided with photodetection circuits.

In some embodiments, each of the plurality of pixel units comprises a pixel compensation circuit. Each of the at least part of pixel units comprises a modulated light generating circuit. The modulated light generating circuit is configured to generate the modulated light having a predetermined frequency. In each of the at least part of the pixel units, a light emitting device is multiplexed by the modulated light generating circuit and the pixel compensation circuit.

Figure 11A:
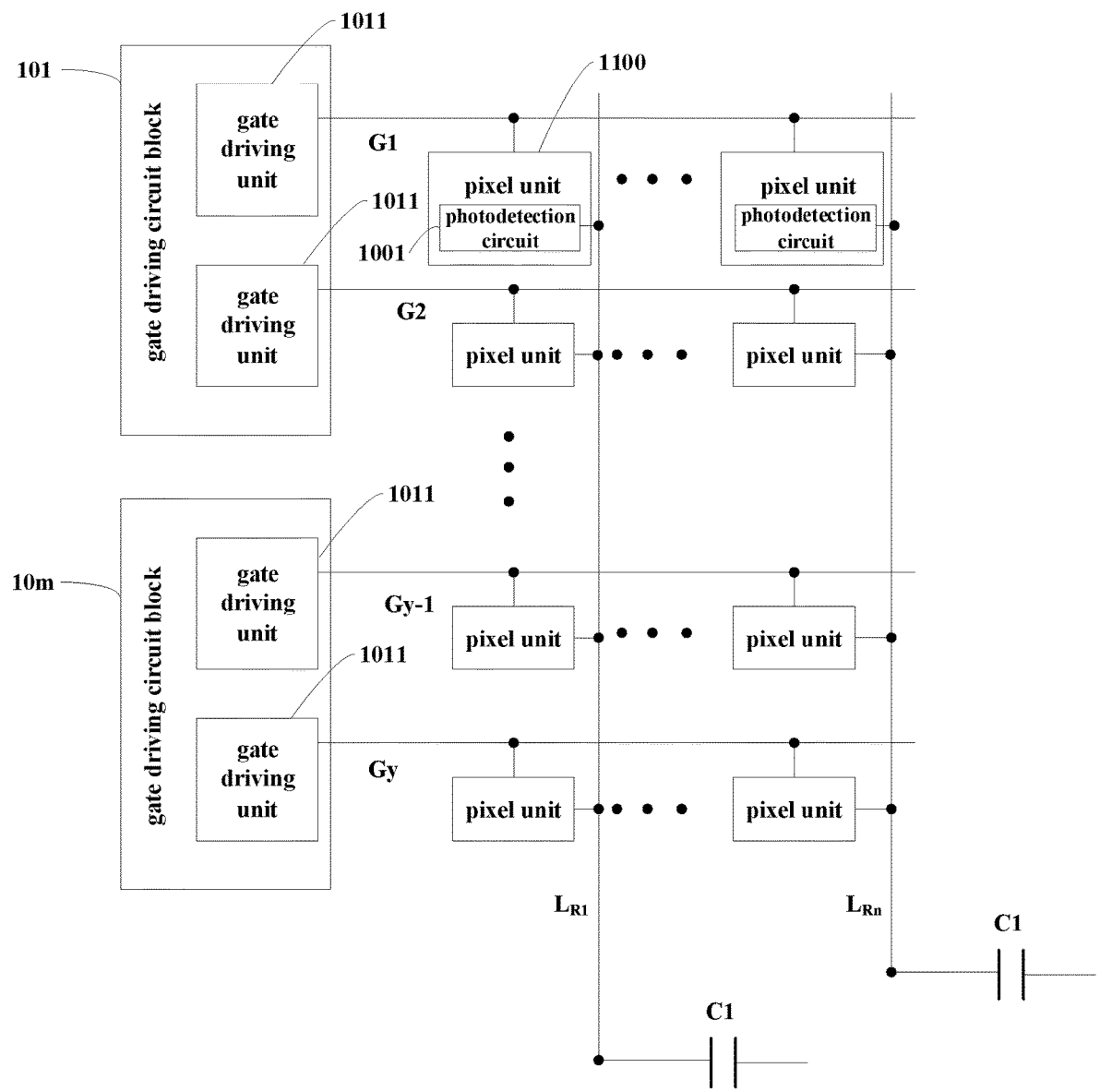
FIG. 11A is a connection diagram showing a touch device according to another embodiment of the present disclosure.

FIG. 11A is a connection diagram showing a touch device according to another embodiment of the present disclosure. Here, the units or devices shown in FIG. 11A that are the same as or similar to those in FIG. 10A will not be described in detail again.

As shown in FIG. 11A, the touch device may further comprise a plurality of pixel units 1100 for display. Each of at least part of pixel units among the plurality of pixel units 1100 is provided with one of the plurality of photodetection circuits (e.g., the photodetection circuits 1001 in FIG. 10A). For example, the photodetection circuit may be provided in each pixel unit.

For example, each pixel unit of the touch device may also comprise a pixel compensation circuit in addition to the photodetection circuit. The third switching transistor T3 described above may be added to the pixel compensation circuit to form a modulated light generating circuit using the third switching transistor T3 and the light emitting device of the pixel compensation circuit, for example, as shown in FIG. 4B. That is, the light emitting device is multiplexed by the modulated light generating circuit and the pixel compensation circuit. For another example, the modulated light generating circuit may be formed using a light emitting device (e.g., an infrared light source) provided outside the display panel and the third switching transistor.

Figure 11B:
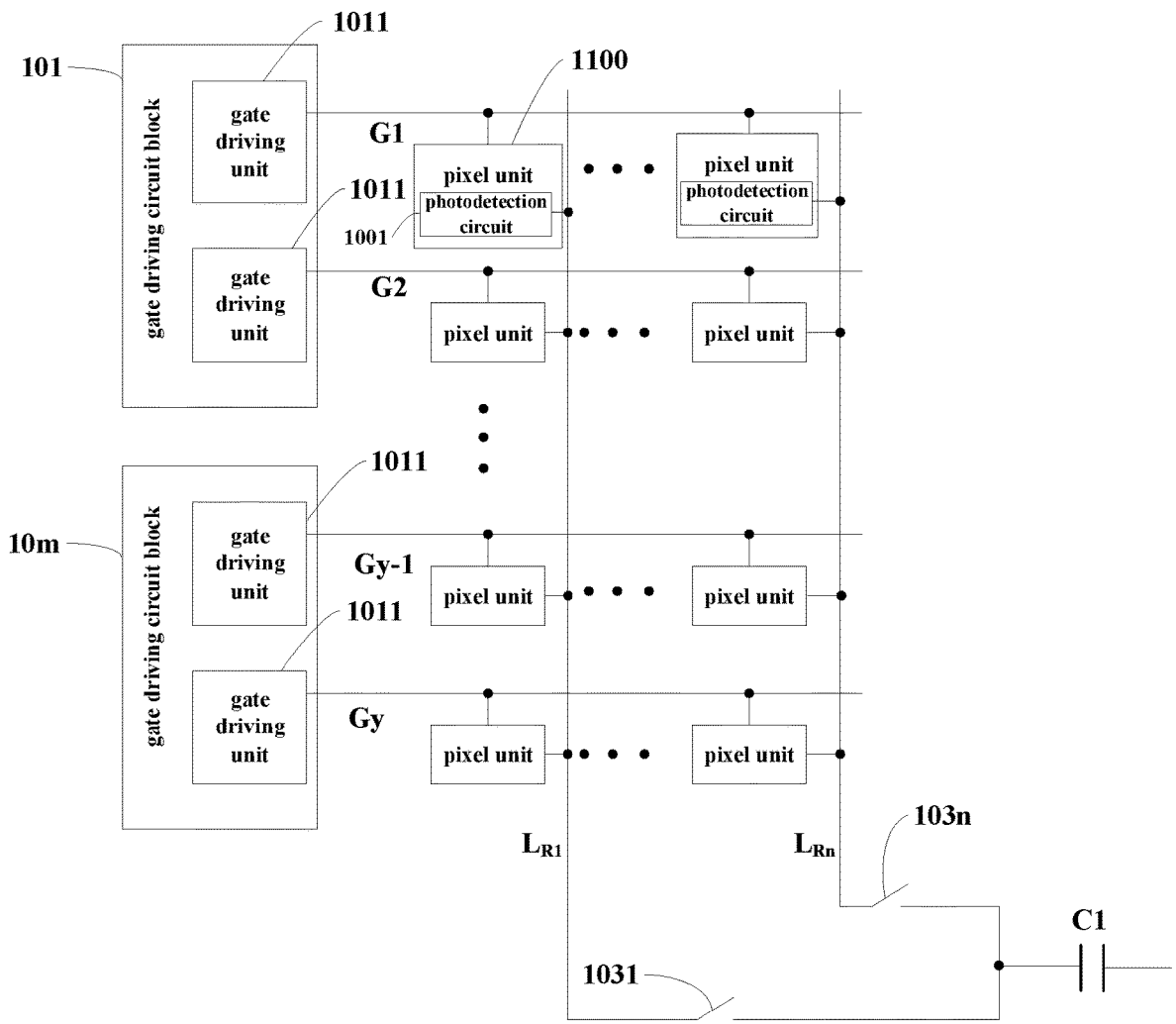
FIG. 11B is a connection diagram showing a touch device according to another embodiment of the present disclosure.

FIG. 11B is a connection diagram showing a touch device according to another embodiment of the present disclosure. Here, the units or devices shown in FIG. 11B that are the same as or similar to those in FIG. 10B will not be described in detail again.

As shown in FIG. 11B, the touch device may further comprise a plurality of pixel units 1100 for display. Each of at least part of the pixel units among the plurality of pixel units 1100 is provided with a photodetection circuit (e.g., the photodetection circuit 1001 in FIG. 10B). For example, the photodetection circuit may be provided in each pixel unit.

Similar to the foregoing, each pixel unit of the touch device may also comprise a pixel compensation circuit in addition to the photodetection circuit. Moreover, a light emitting device is multiplexed by a modulated light generating circuit and the pixel compensation circuit.

It should be noted that, the term "row" according to embodiments of the present disclosure may mean that the unit structures (or devices, circuit structures, and the like) are arranged along a transverse direction or arranged along a vertical direction. Correspondingly, the term "column" may mean that the structures (or devices, circuit structures, and the like) are arranged along a vertical direction or arranged along a transverse direction. For example, when "row" means that the structures are arranged along a transverse direction, "column" means that the structures are arranged along a vertical direction; when "row" means that the structures are arranged along a vertical direction, "column" means that the structures are arranged along a transverse direction.

In other embodiments, the entire pixel array may be divided into several areas. For example, each area is 4 mm×4 mm. Each area comprises a plurality of pixel units, each of which comprises one pixel compensation circuit. Each area further comprises one photodetection circuit. That is, each area comprises a plurality of pixel compensation circuits and one photodetection circuit. This may reduce the number of the photodetection circuits and may also reduce the size of the pixel unit.

Figure 12:
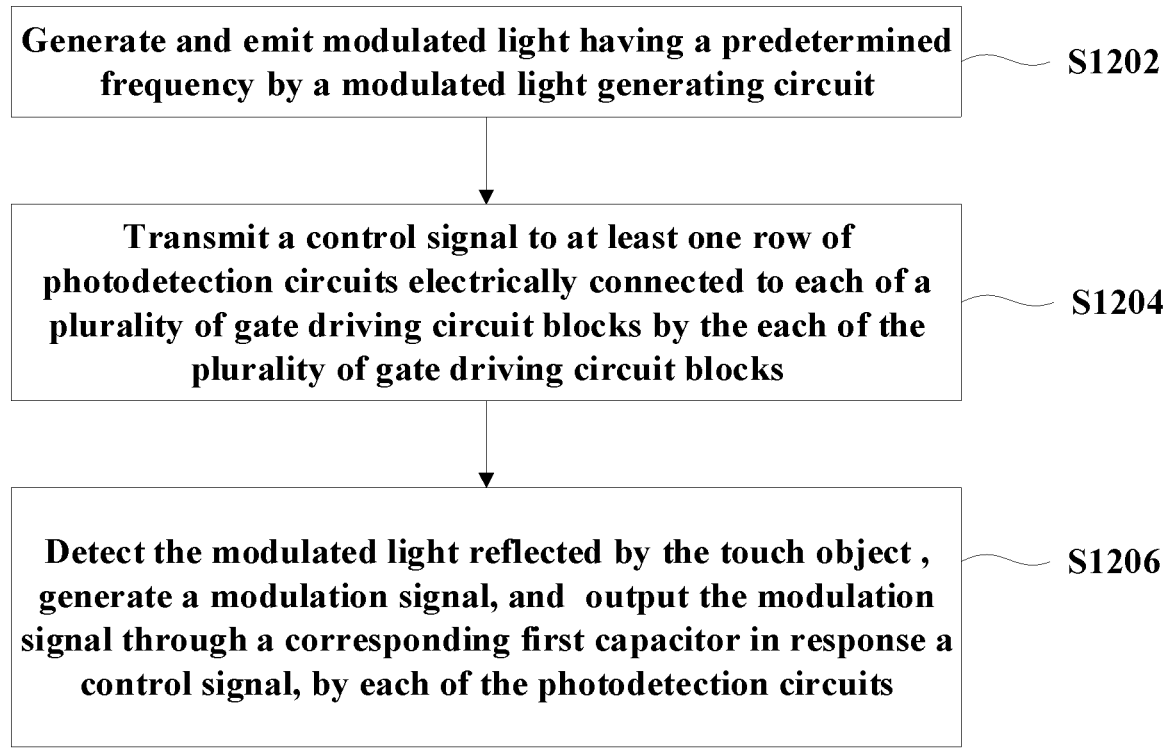
FIG. 12 is a flowchart showing a touch method for a touch device according to an embodiment of the present disclosure.

FIG. 12 is a flowchart showing a touch method for a touch device according to an embodiment of the present disclosure. The touch method may comprise steps S1202 to S1206.

In step S1202, modulated light having a predetermined frequency is generated and emitted by a modulated light generating circuit.

In step S1204, a control signal is transmitted to at least one row of photodetection circuits electrically connected to each of a plurality of gate driving circuit blocks by the each of the plurality of gate driving circuit blocks. For example, the plurality of gate driving circuit blocks sequentially transmit control signals, wherein each control signal is output to the at least one photodetection circuit corresponding to each gate driving circuit block.

In step S1206, the modulated light reflected by the touch object is detected, a modulation signal is generated according to the modulated light, and the modulation signal is output through a corresponding first capacitor in response a control signal, by each of the photodetection circuits. In some embodiments, the step S904 described above may comprise the steps S1204 and S1206 described here.

In the touch method according to the embodiment, modulated light having a predetermined frequency is generated and emitted by the modulated light generating circuit. A control signal is transmitted to a corresponding photodetection circuit by a gate driving circuit block. The modulated light reflected by the touch object is detected a modulation signal is generated according to the modulated light, and the modulation signal is output through a corresponding first capacitor in response a control signal, by each photodetection circuit. Since the first capacitor may produce the effect of blocking a direct current and passing an alternating current, and the signal generated by irradiation of ambient light on the photodetection circuit is a direct current signal, the direct current signal is blocked by the first capacitor, while the modulation signal may be output through the first capacitor. Therefore, the touch method may eliminate the influence of ambient light on photodetection as much as possible.

In some embodiments, the touch method may further comprise: collecting the modulation signal output through the first capacitor using a sampling circuit to obtain a signal to be processed, outputting the signal to be processed to a demodulation circuit; and demodulating the signal to be processed by the demodulation circuit. In this way, touch position detection or fingerprint detection may be implemented.

In some embodiments, the touch method may further comprise: in a touch phase, each of the plurality of gate driving circuit blocks transmits a control signal to all the photodetection circuits electrically connected to the each of the plurality of gate driving circuit blocks, such that all the photodetection circuits corresponding to the gate driving circuit block detects modulated light reflected by the touch object and generates a modulation signal according to the modulated light. In this way, the touch position detection is implemented.

In some embodiments, the touch control method may further comprise: in a fingerprint detection phase, after a touch position is determined, one or more gate driving units of the gate driving circuit block corresponding to the touch position transmit control signals to the corresponding photodetection circuits row by row, such that the corresponding photodetection circuits detect the modulated light reflected by the touch object and generate the modulation signal according to the modulated light. In this way, the fingerprint detection is implemented.

In the above-described embodiment, the touch position detection may be performed first, and then the fingerprint detection is performed after a touch position is determined. During the fingerprint detection, the gate driving units corresponding to the touch position are made to transmit control signals row by row. In this way, the corresponding photodetection circuits detect the modulated light reflected by the touch object and generate modulation signals in response to the control signals. The modulation signals contain fingerprint information. The photodetection circuits output the modulation signals through corresponding first capacitors. Fingerprint information may be obtained by collecting and demodulating the modulation signals.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments or equivalently substitution of part of the technical features may be made without departing from the scope and spirit of the present disclosure. The scope of the disclosure is defined by the following claims.

What is claimed is:

1. A touch circuit, comprising:
at least one photodetection circuit, and a first capacitor electrically connected to the at least one photodetection circuit, wherein each of the at least one photodetection circuit is configured to detect modulated light reflected by a touch object, generate a modulation signal according to the modulated light, and output the modulation signal through the first capacitor;
a modulated light generating circuit configured to generate the modulated light having a predetermined frequency;
a sampling circuit configured to collect the modulation signal output through the first capacitor to obtain a signal to be processed; and
a demodulation circuit configured to demodulate the signal to be processed,
wherein the modulated light generating circuit comprises:
a third switching transistor configured to output an electrical signal having a predetermined frequency in response to a switching signal having the predetermined frequency; and
a light emitting device configured to emit the modulated light according to the electrical signal having the predetermined frequency,
wherein the sampling circuit comprises:
an amplifier, wherein a first input terminal of the amplifier is electrically connected to a second terminal of the first capacitor, a second input terminal of the amplifier is configured to receive a reference level signal, and an output terminal of the amplifier is electrically connected to the demodulation circuit;
a second capacitor, wherein a first terminal of the second capacitor is electrically connected to the first input terminal of the amplifier, and a second terminal of the second capacitor is electrically connected to the output terminal of the amplifier; and
a sampling switch, wherein a first terminal of the sampling switch is electrically connected to the first terminal of the second capacitor, a second terminal of the sampling switch is electrically connected to the second terminal of the second capacitor, and a control terminal of the sampling switch is configured to receive a sampling signal; and
wherein, when the switching signal is at a first level, a start time of the sampling signal is after a start time of the switching signal, and an end time of the sampling signal is before an end time of the switching signal; and when the switching signal is at a second level, the start time of the sampling signal is after the start time of the switching signal, and the end time of the sampling signal is before the end time of the switching signal, wherein the first level is higher than the second level; and a static working point of the at least one photodetection circuit is reset to on at an end of each sampling.

2. The touch circuit according to claim 1, wherein each of the at least one photodetection circuit comprises a photosensitive detector and a first switching transistor, a first terminal of the photosensitive detector is electrically connected to a first voltage terminal, and a second terminal of the photosensitive detector is electrically connected to a first terminal of the first switching transistor; and
a second terminal of the first switching transistor is electrically connected to a first terminal of the first capacitor, and a control terminal of the first switching transistor is configured to receive a control signal.

3. The touch circuit according to claim 2, wherein each of the at least one photodetection circuit further comprises:
a second switching transistor, wherein a first terminal of the second switching transistor is electrically connected to a second voltage terminal, a second terminal of the second switching transistor is electrically connected to the second terminal of the photosensitive detector, and a control terminal of the second switching transistor is configured to receive a reset signal.

4. The touch circuit according to claim 1, wherein an intensity of the modulated light is positively correlated with that of ambient light.

5. A touch device, comprising:
a plurality of gate driving circuit blocks, each of which comprises at least one gate driving unit;
a plurality of photodetection circuits, wherein multiple rows of photodetection circuits among the plurality of photodetection circuits are electrically connected to a plurality of gate driving units among the plurality of gate driving circuit blocks in one-to-one correspondence; and
at least one first capacitor, each of which is electrically connected to one or more columns of photodetection circuits among the plurality of photodetection circuits,
wherein each of the plurality of gate driving circuit blocks is configured to transmit a control signal to at least one row of photodetection circuits electrically connected to the each of the plurality of gate driving circuit blocks; and
each of the plurality of photodetection circuits is configured to detect modulated light reflected by a touch object, generate a modulation signal according to the modulated light, and output the modulation signal through a corresponding first capacitor in response to the control signal;
a modulated light generating circuit configured to generate the modulated light having a predetermined frequency;
a sampling circuit configured to collect the modulation signal output through the first capacitor to obtain a signal to be processed; and
a demodulation circuit configured to demodulate the signal to be processed,
wherein the modulated light generating circuit comprises:
a third switching transistor configured to output an electrical signal having a predetermined frequency in response to a switching signal having the predetermined frequency; and
a light emitting device configured to emit the modulated light according to the electrical signal having the predetermined frequency,
wherein the sampling circuit comprises:
an amplifier, wherein a first input terminal of the amplifier is electrically connected to a second terminal of the first capacitor, a second input terminal of the amplifier is configured to receive a reference level signal, and an output terminal of the amplifier is electrically connected to the demodulation circuit;

a second capacitor, wherein a first terminal of the second capacitor is electrically connected to the first input terminal of the amplifier, and a second terminal of the second capacitor is electrically connected to the output terminal of the amplifier; and a sampling switch, wherein a first terminal of the sampling switch is electrically connected to the first terminal of the second capacitor, a second terminal of the sampling switch is electrically connected to the second terminal of the second capacitor, and a control terminal of the sampling switch is configured to receive a sampling signal; and wherein, when the switching signal is at a first level, a start time of the sampling signal is after a start time of the switching signal, and an end time of the sampling signal is before an end time of the switching signal; and when the switching signal is at a second level, the start time of the sampling signal is after the start time of the switching signal, and the end time of the sampling signal is before the end time of the switching signal, wherein the first level is higher than the second level; and a static working point of the at least one photodetection circuit is reset to on at an end of each sampling.

6. The touch device according to claim 5, wherein the at least one first capacitor comprises a plurality of first capacitors;

wherein the plurality of first capacitors are electrically connected to multiple columns of photodetection circuits among the plurality of photodetection circuits in one-to-one correspondence.

7. The touch device according to claim 5, wherein at least partial columns of photodetection circuits among the plurality of photodetection circuits are electrically connected to a same first capacitor through switching devices respectively.

8. The touch device according to claim 5, further comprising:

a plurality of pixel units for display, wherein each of at least part of pixel units among the plurality of pixel units is provided with one of the plurality of photodetection circuits.

9. The touch device according to claim 8, wherein each of the plurality of pixel units comprises a pixel compensation circuit and;

each of the at least part of pixel units comprises the modulated light generating circuit, wherein, in each of the at least part of pixel units, a light emitting device is multiplexed by the modulated light generating circuit and the pixel compensation circuit.

10. A touch method based on a touch circuit, comprising:
generating and emitting modulated light having a predetermined frequency by a modulated light generating circuit; and detecting the modulated light reflected by a touch object, generating a modulation signal according to the modulated light, and outputting the modulation signal through a first capacitor, by a photodetection circuit, wherein the modulated light generating circuit comprises:
a third switching transistor configured to output an electrical signal having a predetermined frequency in response to a switching signal having the predetermined frequency; and a light emitting device configured to emit the modulated light according to the electrical signal having the predetermined frequency, wherein the touch circuit comprises:
a sampling circuit configured to collect the modulation signal output through the first capacitor to obtain a signal to be processed; and a demodulation circuit configured to demodulate the signal to be processed, wherein the sampling circuit comprises:
an amplifier, wherein a first input terminal of the amplifier is electrically connected to a second terminal of the first capacitor, a second input terminal of the amplifier is configured to receive a reference level signal, and an output terminal of the amplifier is electrically connected to the demodulation circuit;

a second capacitor, wherein a first terminal of the second capacitor is electrically connected to the first input terminal of the amplifier, and a second terminal of the second capacitor is electrically connected to the output terminal of the amplifier; and a sampling switch, wherein a first terminal of the sampling switch is electrically connected to the first terminal of the second capacitor, a second terminal of the sampling switch is electrically connected to the second terminal of the second capacitor, and a control terminal of the sampling switch is configured to receive a sampling signal; and the touch method further comprises: applying a sampling signal to the sampling circuit to cause the sampling circuit to collect the modulation signal output through the first capacitor to obtain a signal to be processed; and demodulating the signal to be processed by the demodulation circuit, wherein the generating and emitting of the modulated light having the predetermined frequency by the modulated light generating circuit comprises: applying a switching signal having the predetermined frequency to the modulated light generating circuit to cause the modulated light generating circuit to emit the modulated light, wherein, when the switching signal is at a first level, a start time of the sampling signal is after a start time of the switching signal, and an end time of the sampling signal is before an end time of the switching signal; and when the switching signal is at a second level, the start time of the sampling signal is after the start time of the switching signal, and the end time of the sampling signal is before the end time of the switching signal, wherein the first level is higher than the second level; and a static working point of the at least one photodetection circuit is reset to on at an end of each sampling.

11. The touch method according to claim 10, wherein the photodetection circuit comprises: a photosensitive detector, a first switching transistor, and a second switching transistor; a first terminal of the photosensitive detector electrically connected to a first voltage terminal, and a second terminal of the photosensitive detector electrically connected to a first terminal of the first switching transistor; a second terminal of the first switching transistor electrically connected to a first terminal of the first capacitor, and a control terminal of the first switching transistor configured to receive a control signal; a first terminal of the second switching transistor electrically connected to a second voltage terminal, a second terminal of the second switching transistor electrically connected to the second terminal of the photosensitive detector, and a control terminal of the second switching transistor configured to receive a reset signal, wherein the step of detecting the modulated light reflected by the touch object and generating the modulation signal by the photodetection circuit comprises:
applying the reset signal to the second switching transistor of the photodetection circuit during collection of the modulation signal, so that the second switching transistor is turned on to reset a potential at the second terminal of the photosensitive detector.

12. The touch method according to claim 10, wherein an intensity of the modulated light is positively correlated with that of ambient light.

13. The touch method according to claim 10, wherein the step of detecting the modulated light reflected by the touch object, generating the modulation signal, and outputting the modulation signal through the first capacitor by the photodetection circuit comprises:
transmitting a control signal to at least one row of photodetection circuits electrically connected to each of a plurality of gate driving circuit blocks by the each of the plurality of gate driving circuit blocks; and
detecting the modulated light reflected by the touch object, generating the modulation signal according to the modulated light, and outputting the modulation signal through a corresponding first capacitor in response to the control signal, by each of the corresponding photodetection circuits.

14. The touch method according to claim 13, further comprising:
in a touch phase, each of the plurality of gate driving circuit blocks transmits the control signal to all the photodetection circuits electrically connected to the each of the plurality of gate driving circuit blocks, such that all the photodetection circuits corresponding to the each of plurality of gate driving circuit blocks detect the modulated light reflected by the touch object and generate the modulation signal according to the modulated light; and
in a fingerprint detection phase, after a touch position is determined, one or more gate driving units of a gate driving circuit block corresponding to the touch position transmit the control signal to corresponding photodetection circuits row by row, such that the corresponding photodetection circuits detect the modulated light reflected by the touch object and generate the modulation signal according to the modulated light.

* * * * *